United States Patent
Nahir et al.

(10) Patent No.: US 10,387,208 B2
(45) Date of Patent: Aug. 20, 2019

(54) DISTRIBUTED CLOUD COMPUTING ELASTICITY

(71) Applicant: Technion Research & Development Foundation Limited, Haifa (IL)

(72) Inventors: Amir Nahir, Megadim (IL); Ariel Orda, Haifa (IL); Dan Raz, Timrat (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 14/798,526

(22) Filed: Jul. 14, 2015

(65) Prior Publication Data

US 2016/0019074 A1 Jan. 21, 2016

Related U.S. Application Data

(60) Provisional application No. 62/024,599, filed on Jul. 15, 2014.

(51) Int. Cl.
| | |
|---|---|
| *G06F 9/50* | (2006.01) |
| *G06F 9/455* | (2018.01) |
| *H04L 29/08* | (2006.01) |
| *H04L 29/06* | (2006.01) |

(52) U.S. Cl.
CPC ........ *G06F 9/5077* (2013.01); *G06F 9/45558* (2013.01); *G06F 9/505* (2013.01); *G06F 2009/4557* (2013.01); *H04L 67/02* (2013.01); *H04L 67/1097* (2013.01); *H04L 69/28* (2013.01)

(58) Field of Classification Search
None
See application file for complete search history.

(56) References Cited

U.S. PATENT DOCUMENTS

| | | | | |
|---|---|---|---|---|
| 7,761,421 | B2* | 7/2010 | Frolund | G06F 11/1662 707/637 |
| 8,359,594 | B1* | 1/2013 | Davidson | G06F 9/5077 709/218 |
| 9,116,752 | B1* | 8/2015 | Petit-Huguenin | G06F 9/5083 |
| 2008/0104608 | A1* | 5/2008 | Hyser | G06F 9/5027 718/105 |
| 2010/0257524 | A1* | 10/2010 | Weissman | G06F 9/485 718/1 |

(Continued)

OTHER PUBLICATIONS

G. Galante and L. C. E. D. Bona. "A survey on cloud computing elasticity". In Proceedings of the 5th International Conference on Utility and Cloud Computing, pp. 263-270, 2012.

(Continued)

*Primary Examiner* — Wynuel S Aquino
(74) *Attorney, Agent, or Firm* — Roach Brown McCarthy & Gruber, PC; Kevin D. McCarthy

(57) ABSTRACT

A method comprising, in a cloud computing system: receiving a new job at the cloud computing system; sampling VMs (Virtual Machines) of the cloud computing system for the load currently handled by each of the VMs; if the load currently handled by the VMs is within operational bounds, sending the new job to one of the VMs which currently handles the highest load compared to other ones of the VMs; and if the load currently handled by the VMs is beyond operational bounds, sending the new job to one of the VMs which currently handles the lowest load compared to other ones of the VMs.

24 Claims, 17 Drawing Sheets

(56) References Cited

U.S. PATENT DOCUMENTS

| | | | | |
|---|---|---|---|---|
| 2011/0161957 A1* | 6/2011 | Bernardi | ............... | G06F 9/4445 718/1 |
| 2012/0060171 A1* | 3/2012 | Bobroff | .................. | G06F 9/505 718/105 |
| 2013/0055260 A1* | 2/2013 | Zlotkin | ............... | G06F 9/45533 718/1 |
| 2013/0238780 A1* | 9/2013 | Devarakonda | ........ | G06F 9/5072 709/224 |
| 2013/0254761 A1* | 9/2013 | Reddy | ................ | G06F 9/45558 718/1 |

OTHER PUBLICATIONS

T. C. Chieu, A. Mohindra, A. A. Karve, and A. Segal. "Dynamic scaling of web applications in a virtualized cloud computing environment". In Proceedings of the IEEE International Conference on e-Business Engineering (ICEBE), pp. 281-286, 2009.

L. Zhang, X. P. Li, and S. Yuan. "A content-based dynamic load-balancing algorithm for heterogeneous web server cluster", in Advances in Computer Animation and Digital Entertainment, 7(1):153-162, 2010.

M. Mao, J. Li, and M. Humphrey. "Cloud auto-scaling with deadline and budget constraints", In Proceedings of the 11th International Conference on Grid Computing (GRID), pp. 41-48, 2010.

RightScale at http://www.rightscale.com, last accessed May 25, 2014.

Scalr. http://scalr.net, last accessed May 25, 2014.

Z. Gong, X. Gu, and J. Wilkes. "PRESS: PRedictive Elastic ReSource Scaling for cloud systems", in Proceedings of the International Conference on Network and Service Management (CNSM), pp. 9-16, 2010.

H. Nguyen, Z. Shen, X. Gu, S. Subbiah, and J. Wilkes. "AGILE: elastic distributed resource scaling for infrastructure-as-a-service", inProceedings of the 10th International Conference on Autonomic Computing (ICAC), 2013.

H. Liu and S. Wee. "Web server farm in the cloud: Performance evaluation and dynamic architecture", in Proceedings of the First International Conference on Cloud Computing (CloudCom), pp. 369-380, 2009.

M. Mitzenmacher, "The power of two choices in randomized load balancing", in IEEE Transactions on Parallel and Distributed Systems, 12(10):1094-1104, Oct. 2001.

A. Gandhi, M. Harchol-Balter, R. Raghunathan, and M. A. Kozuch. "Autoscale: Dynamic, robust capacity management for multi-tier data centers", in ACM Transactions on Computer Systems, 30(4):14, 2012.

David Breitgand, Rami Cohen, Amir Nahir and Danny Raz, "On cost-aware monitoring for self-adaptive load sharing" in IEEE Selected Areas in Communications, vol. 28(1), pp. 70-83, 2010.

M. Mao and M. Humphrey, "A performance study on the VM startup time in the cloud", in Proceedings of the 5th International Conference on Cloud Computing (CLOUD), pp. 423-430, 2012.

* cited by examiner

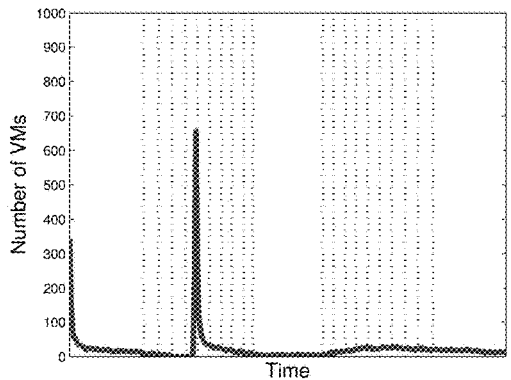
FIG. 13A
FIG. 13B
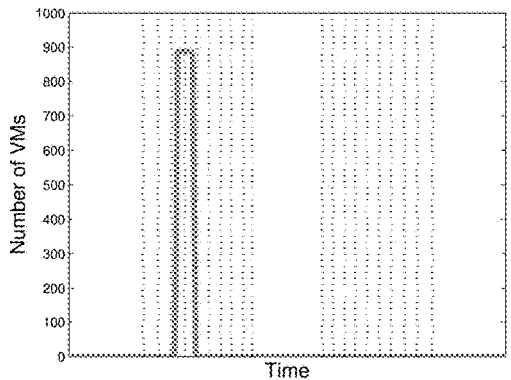
FIG. 13C
FIG. 13D

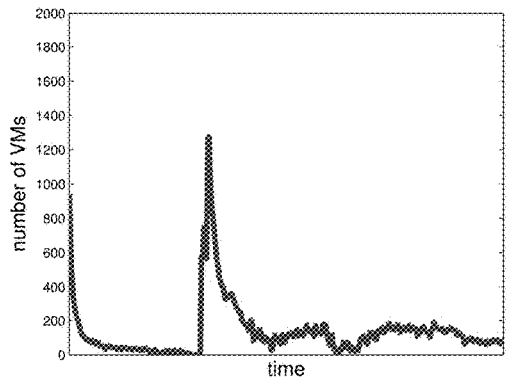

DISTRIBUTED CLOUD COMPUTING ELASTICITY

CROSS-REFERENCE TO RELATED APPLICATIONS

This application claims the benefit of U.S. Provisional Application No. 62/024,599 filed Jul. 15, 2014 and entitled "Distributed Cloud Computing Elasticity", the contents of which are incorporated herein by reference in their entirety.

FIELD OF THE INVENTION

Embodiments of the disclosure relate to the field of cloud computing.

BACKGROUND

One of the important concepts behind the adoption of cloud computing is the Pay-As-You-Go model. In this model, which is currently in use by major cloud providers such as Amazon EC2 and Microsoft Azure, service providers pay only for allocated resources, and the amount of these resources can be dynamically modified. For example, paying per VM (Virtual Machine) is done only for the duration of the VM's lifetime.

However, this model places a major dilemma to the service providers, namely—how much resource to acquire? Indeed, on the one hand, a higher amount of resources leased from the cloud results in better service quality; but on the other hand, a higher amount of resources incurs higher operational expenses, as the service provider has to pay the cloud owner for the amount of requested resources. In other words, while increasing the amount of resources used by the service has the potential of increasing its income, over-provisioning may lead to decrease in revenue.

Determining the right amount of resources to lease from the cloud so as to optimize the revenue is a complicated task due to the varying rate of user requests and the complex relation among the demand, the amount of allocated resources and the quality of the service.

One of the most common mechanisms used to address this challenge is elasticity, that is, the ability to dynamically adjust the amount of the resources allocated to the service, typically VMs or storage, based on the demand for that service. This capability is used, for example, by on-line shopping service providers in order to expand their service around the end of the year when demand rises as people go on-line to do their holiday shopping; when the holiday season is over and demand drops, the service providers can scale down their service and release the resources back to the cloud. Another example, where resource allocation should be adjusted in a much shorter time frame, is a case where a large-scale disaster occurs and users log in to report their experience or check on their relatives and friends. In such a scenario, the demand for social network services may increase rapidly and unexpectedly during a short period of time, thus the amount of resources allocated to the service should be adjusted accordingly in order to maintain the desired user experience.

Typically, the dynamic adaptation of the allocated resources is accomplished by monitoring their state. However, for large cloud-based services, tracking the performance of each server or VM and monitoring each user request is often impractical. There is a long-felt-need for techniques that can provide efficient elasticity under such conditions.

Many elasticity schemes, such as those discussed in G. Galante and L. C. E. D. Bona. "A survey on cloud computing elasticity". In *Proceedings of the 5th International Conference on Utility and Cloud Computing*, pages 263-270, 2012, share some fundamental aspects, namely: an elasticity controller tracks the state of the available resources and determines whether they meet the demand for the service with respect to some optimization function. The elasticity controller may determine that provisioning of more resources is required, or that some resources may be released and returned to the cloud provider. A common architecture is depicted in FIG. 1.

Elasticity controllers differ from each other in the techniques and means that they employ for performing their tasks. For example, some elasticity mechanisms, e.g. Amazon's Auto-Scale, evaluate service performance through direct hardware measurement such as CPU utilization; other mechanisms measure performance by metrics that are available only at the hypervisor/operating system/application layer. For example, in T. C. Chieu, A. Mohindra, A. A. Karve, and A. Segal. "Dynamic scaling of web applications in a virtualized cloud computing environment". In *Proceedings of the IEEE International Conference on e-Business Engineering (ICEBE)*, pages 281-286, 2009, the VM's load is measured through the number of open HTTP connections it has. Other means may include requests per minute, number of users that are logged on, or response time. In L. Zhang, X. P. Li, and S. Yuan. "A content-based dynamic load-balancing algorithm for heterogeneous web server cluster", in *Advances in Computer Animation and Digital Entertainment*, 7(1):153-162, 2010, the authors propose a combination of the aforementioned metrics to determine the load.

Moreover, while some elasticity controllers simply consider the average job completion time, others address stricter SLA criteria. For example, M. Mao, J. Li, and M. Humphrey. "Cloud auto-scaling with deadline and budget constraints", In Proceedings of the 11th International Conference on Grid Computing (*GRID*), pages 41-48, 2010, considers jobs with individual deadlines.

A different technique to handle varying demand for a service is to provision resources based on a pre-defined schedule. See RightScale at http://www.rightscale.com, last accessed May 25, 2014, and Scalr. http://scalr.net, last accessed May 25, 2014. Such elasticity controllers may have rules like "On Mondays, between 11 AM and 4 PM, have the service running on 5 VMs". This approach is suitable when the service provider has good confidence in its ability to pre-determine the load at given times.

Authors of Z. Gong, X. Gu, and J. Wilkes. "PRESS: PRedictive Elastic ReSource Scaling for cloud systems", in *Proceedings of the International Conference on Network and Service Management (CNSM)*, pages 9-16, 2010 and H. Nguyen, Z. Shen, X. Gu, S. Subbiah, and J. Wilkes. "AGILE: elastic distributed resource scaling for infrastructure-as-a-service", in *Proceedings of the 10th International Conference on Autonomic Computing (ICAC)*, 2013, apply prediction based (centralized) techniques to determine when a new VM needs to be powered up in time to ensure that the new VM is up and running when the load rises.

The relation between the elasticity controller and the load balancer is clear. First, both mechanisms rely on data regarding the VM state for making their decisions. More importantly, when the elasticity controller determines that a VM should be released soon and returned to the cloud provider, the load balancer is required to be aware of such information in order to avoid sending new user requests to that VM. Conversely, a resource that is soon to be released is probably "attractive" to a load balancer, as it is likely to be lightly loaded. In T. C. Chieu, A. Mohindra, A. A. Karve, and A. Segal. "Dynamic scaling of web applications in a virtualized cloud computing environment". In *Proceedings of the IEEE International Conference on e-Business Engineering (ICEBE)*, pages 281-286, 2009, the authors assume that the load balancer complies with the instructions of the elasticity controller and is capable of migrating HTTP sessions in order to enable the release of resources.

Taking a centralized approach in implementing a load balancer or an elasticity controller may create bottlenecks and severely impact the quality of the service and its scalability. For example, H. Liu and S. Wee. "Web server farm in the cloud: Performance evaluation and dynamic architecture", in *Proceedings of the First International Conference on Cloud Computing (CloudCom)*, pages 369-380, 2009, reports a case where an AWS load balancer is unwilling to handle further user requests when 950 jobs are pending. Such a number may be prohibitive for social networks or search engines.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising, in a cloud computing system: receiving a new job at the cloud computing system; sampling VMs (Virtual Machines) of the cloud computing system for the load currently handled by each of the VMs; if the load handled by the VMs is within operational bounds, sending the new job to one of the VMs which currently handles the highest load compared to the other VMs; and if the load currently handled by the VMs is beyond operational bounds, sending the new job to one of the VMs which currently handles a lowest load compared to the other VMs.

There is further provided, in accordance with an embodiment, a cloud computing system comprising at least one hardware processor configured to: receive a new job; sample VMs (Virtual Machines) of the cloud computing system for the load currently handled by each of the VMs; if the load currently handled by the VMs is within operational bounds, send the new job to one of the VMs which currently handles a highest load compared to the other VMs; and if the load currently handled by the VMs is beyond operational bounds, send the new job to one of the VMs which currently handles the lowest load compared to the other VMs.

There is yet further provided, in accordance with an embodiment, a computer program product comprising a non-transitory computer-readable storage medium having program code embodied thereon, the program code executable by at least one hardware processor for: receiving a new job at a cloud computing system; sampling VMs (Virtual Machines) of the cloud computing system for a load currently handled by each of the VMs; if the load currently handled by the VMs is within operational bounds, sending the new job to one of the VMs which currently handles the highest load compared to other ones of the VMs; and if the load currently handled by the VMs is beyond operational bounds, sending the new job to one of the VMs which currently handles the lowest load compared to other ones of the VMs.

In some embodiments, the method further comprises, or the code is further executable for, instantiating a new VM in the cloud computing system if the load currently handled by the VMs exceeds an activation threshold, the activation threshold being larger than the operational bounds.

In some embodiments, the method further comprises, or the code is further executable for, applying a growth limit policy to new VM instantiation.

In some embodiments, the method further comprises, or the code is further executable for, deciding, by each of the VMs, when to terminate itself.

In some embodiments, the deciding is based on running a timer by each of the VMs when each of the VMs becomes idle.

In some embodiments, the sampled VMs are a randomly-selected subset of all VMs presently running at the cloud computing system.

In some embodiments, the at least one hardware processor is further configured to or the code it executable to instantiate a new VM in the cloud computing system if the load currently handled by the VMs is beyond some bounds.

In some embodiments, the at least one hardware processor is further configured to or the code it executable to apply a growth limit policy to new VM instantiation.

There is further provided, in accordance with an embodiment, a method for power saving in a system of multiple physical servers, the method comprising: receiving a request to instantiate a new VM (Virtual Machine) at the system; sampling physical servers of the system for a load currently handled by each of the physical servers; if the load currently handled by the physical servers is within operational bounds, instantiating the new VM in one of the physical server which currently handles the highest load compared to other ones of the physical servers; and if the load currently handled by the physical servers is beyond operational bounds, sending the new job to one of the physical servers which currently handles the lowest load compared to other ones of the physical servers.

In some embodiments, the method further comprises activating a new physical server in the system if the load currently handled by the physical servers exceeds an activation threshold, the activation threshold being larger than the operational bounds.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

FIGS. 8C-8F are based on HTTP traces;

FIGS. 13A-13D show the state of the deployed VMs under the gradually changing pattern;

FIGS. 19A-19D show VM states when running with the RTP 2007-10-09 trace;

DETAILED DESCRIPTION

Figure 1:
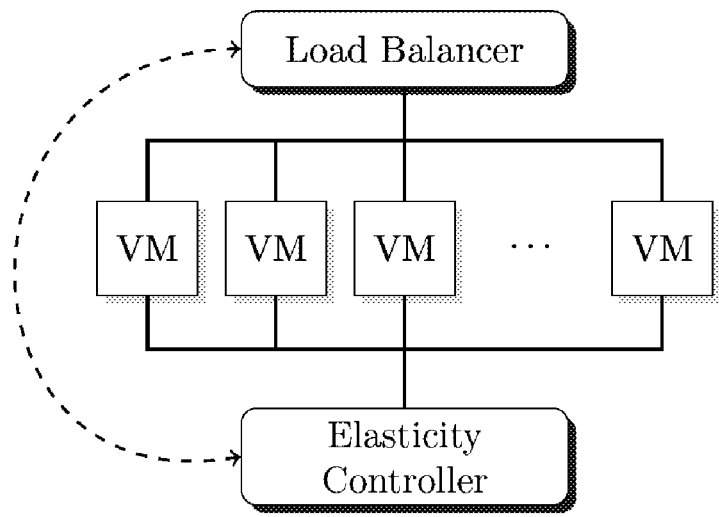
FIG. 1 shows a common elasticity architecture, in accordance with prior art.

Disclosed herein is a cloud computing elasticity architecture which comprises two components, namely: a task assignment policy and a VM management policy. The components may execute on one or more hardware processors of a cloud computing system, which also comprises volatile and non-volatile memories, as known in the art. Each of these components may work in a distributed manner without assuming full knowledge of the overall system state.

The present task assignment policy strives to "pack" VMs with as many jobs as possible, while ensuring that they remain within operational bounds, i.e., that all the requests can be serviced within SLA (Service Level Agreement) requirements. The operation bounds may also be referred to as a "packing threshold", which serves as an aid to deciding whether a certain VM can be packed with an additional job or not. It is assumed, for purposes of this disclosure, that the service provider needs to comply with an SLA that specifies a target maximum time that a job spends in the system and the allowable rate of violations from this target.

Advantageously, the present task assignment policy may reduce costs bourn by service providers who purchase cloud computing resources according to the Pay-As-You-Go model.

Fundamentally, the present cloud computing elasticity architecture is the opposite of the classic Supermarket Model (M. Mitzenmacher, "The power of two choices in randomized load balancing", in *IEEE Transactions on Parallel and Distributed Systems*, 12(10):1094-1104, October 2001); upon the arrival of a new job to the system, some d VMs are sampled uniformly at random for their load. However, instead of sending the job to the least loaded VM (as the Supermarket Model would do), it is sent to the most loaded among the sampled VMs that are within the operational bounds (i.e., capable of meeting SLA requirements). Only if all sampled VMs are loaded beyond an activation threshold, which is larger than the operational bounds, a new VM is instantiated, and the job is sent to this new VM. The reasons for the activation threshold being larger than the operational bounds is that the d sampled VMs may occasionally exceed the operational bounds; however, since these VMs were sampled randomly, it is likely that some other, non-sampled VMs, are still within operational bounds. Hence, it makes sense not to instantiate a new VM if the d sampled VMs are only slightly above operational bounds. Instead, a new VM is instantiated if the d sampled VMs are loaded significantly more than the operational bounds. Accordingly, in some embodiments, the activation threshold may be set to at least 10% beyond the operational bounds. In further embodiments, the activation threshold may be set to at least 20% beyond the operational bounds. In yet further embodiments, the activation threshold may be set to at least 30% beyond the operational bounds.

Similarly to the Supermarket model, the present task assignment policy admits a fully distributed implementation.

The term "load", as referred to herein, may relate to one or more measures for the computing burden experienced by a VM. Examples of such measures include: the number of jobs presently active in the VM, the number of HTTP (HyperText Transfer Protocol) connections currently active in the VM, the CPU (Central Processing Unit) utilization (measured in percentage of available CPU power) of the VM, RAM (Random Access Memory) utilization (percentage or absolute amount) of the VM, etc.

The effectiveness of the present task assignment policy has been evaluated by simulations of synthetic arrival patterns and real traces as well as by an EC2-based implementation. It has been demonstrated that this policy is highly efficient in keeping the number of active VMs to minimum while enabling the service to meet SLA requirements albeit the lack of coordination among the distributed components.

The present VM management policy calls for the instantiation of a new VM whenever all sampled VMs are overloaded. Furthermore, the distributed policy defined in A. Gandhi, M. Harchol-Balter, R. Raghunathan, and M. A. Kozuch. "Autoscale: Dynamic, robust capacity management for multi-tier data centers", in *ACM Transactions on Computer Systems*, 30(4):14, 2012, is adopted (there, in the realm of power management) to determine when to release VM resources back to the cloud, namely: if a VM completes the processing of all jobs assigned to it, and receives no new jobs for some time, then it turns itself down, thus releasing all resources back to the cloud provider. Due to the "packing" property of the task assignment policy, each VM can make this decision by itself, thus not requiring any centralized control.

To fully investigate the applicability of the present architecture it has been tested with a variety of load patterns, including four patterns based on real HTTP (HyperText Transfer Protocol) traces, and three synthetic loads exhibiting a fixed, a gradually changing and a sharply changing arrival rate. It has been shown that, in such a completely distributed setup, the present architecture is able to adapt to changing load, by adjusting the number of active VMs as needed in order to meet the SLA goals under the new load. When the load rises, numerous arriving jobs sample overloaded VMs, and new VMs are instantiated. It has been shown that, even under a very drastic change in load, the present architecture quickly adapts to the new state and the time period in which SLA requirements are violated is very short. It should be noted that such a time period is on account of the time required to instantiate a new VM, and cannot be avoided without significantly over-provisioning, and consequently increasing the operational costs of the service.

Figure 2:
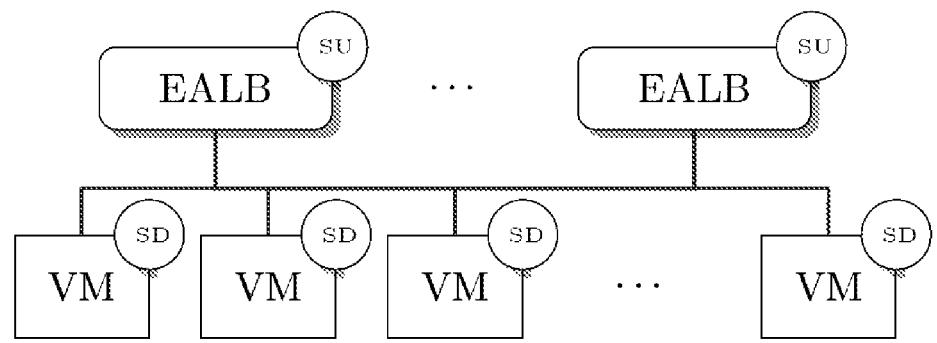
FIG. 2 shows a schematic depiction of a cloud computing elasticity architecture, in accordance with an embodiment.

The present cloud computing elasticity architecture is schematically depicted in FIG. 2. Note that this architecture does not include a single entity to manage elasticity. Instead, a fully scalable load balancer (denoted by EALB in the figure, for Elasticity-Aware Load Balancer) is augmented with the ability to request more resources from the cloud provider based on its estimation of the system's state (denoted by SU in the figure, for Scale-Up). The ability to decide that a VM can be terminated and its resources released to the cloud (denoted by SD in the figure, for Scale-Down) is given to the VM itself. Note that naive load balancing techniques are inadequate for purposes of the present disclosure since, as stated above, they target at lightly loaded resources. The load balancing scheme is therefore modified to be elasticity-aware.

The SLA measuring notion employed in Gandhi (2012) may be adopted, which requires that over 95% of all jobs complete within a pre-defined time limit. This pre-defined limit is denoted by $t^{SLA}$ (measured in the same time units as the job processing time).

The present task assignment policy strives to "pack" VMs so as to hold some predefined number of jobs (i.e. the operational bounds), $T^P$ (where P denotes packing). Upon the arrival of a new user request, d randomly selected VMs are sampled for their load, wherein d is a subset of all VMs presently running at the cloud computing system. d is further discussed below, with reference to FIG. 6. d may be predetermined as a static value, which is, generally, a tradeoff between the desire to reach statistically-significant results of the sampling, and the fact that over-sampling has a high computational cost. As an alternative to setting d statically, d may be adjusted, from time to time, so as to optimize the performance of the present task assignment policy. For example, the principles discussed in David Breitgand, Rami Cohen, Amir Nahir and Danny Raz, "On cost-aware monitoring for self-adaptive load sharing" in *IEEE Selected Areas in Communications*, Volume 28(1), pages 70-83, 2010 with regard to monitoring, may be used for adjusting d.

If one, or more, of the sampled VMs holds less than $T^P$ jobs, then the new job is sent to the most loaded among these VMs. If each of the sampled VMs holds $T^P$ or more jobs, then the job is sent to the least loaded VM (as done in the classic Supermarket model). The present architecture may therefore be termed as the Reversed Supermarket Model.

The VM management policy determines when to instantiate new VMs and when to turn off active ones, as follows.

Upon the arrival of a job (e.g., new user request), in case all d sampled VMs hold $T^A$ or more jobs ($T^A$ being an activation threshold, where A stands for activation), a new VM is instantiated. It is assumed it takes $t_{wake}$ time units from the moment the instantiation command is given to the moment the VM is up and ready to process user requests. See M. Mao and M. Humphrey, "A performance study on the VM startup time in the cloud", in *Proceedings of the 5$^{th}$ International Conference on Cloud Computing (CLOUD)*, pages 423-430, 2012.

The service provider is expected to set $T^A \geq T^P$. This is a rather intuitive requirement, calling for the activation of new VMs only when all sampled VMs are under high load. In the sequel it is explained why it is prudent to set $T^A > T^P$. In such a case, following the task assignment policy defined above, the user request is sent to the least loaded VM out of the d sampled VMs.

The definition of A. Gandhi, M. Harchol-Balter, R. Raghunathan, and M. A. Kozuch. "Autoscale: Dynamic, robust capacity management for multi-tier data centers", in *ACM Transactions on Computer Systems*, 30(4):14, 2012 in determining when VMs are shut down may be followed. Essentially, each VM decides for itself if and when to shut down. Specifically, if a VM turns idle and receives no new user request for a time period of $t_{wait}$, it turns itself down. This "termination" rule enables a fully distributed implementation of the present architecture, removing the required overhead of tracking VM state and analyzing the system load through some centralized component.

Static System

A discussion of a static system model is now presented, that is, a system in which there are M active VMs at all times (no new VMs are instantiated and no VMs shut down). This simple model enables gaining significant insight into the behavior of the system that runs the present scheme.

For sake of analysis, it is assumed that user requests arrive at the service according to a Poisson process at an aggregate rate of $\lambda N$, where N is the number of users. The service is provided through multiple VMs, each of which conducts an exponentially distributed service at a rate of $\mu$. Denote by M(t) the number of active VMs in the system at time t, therefore, at that time, the effective load on each VM, denoted by $\lambda^{eff}(t)$, is, on average, $$\lambda \frac{N}{M(t)}.$$

Notations similar to the ones in M. Mitzenmacher, "The power of two choices in randomized load balancing", in *IEEE Transactions on Parallel and Distributed Systems*, 12(10):1094-1104, October 2001, are employed as follows. $n_i(t)$ denotes the number of VMs with i jobs at time t; $m_i(t)$ denotes the number of VMs with at least i jobs at time t; $p_i(t)$ is the fraction of the VMs with i jobs at time t, that is, $$p_i(t) = \frac{n_i(t)}{M(t)},$$

and $s_i(t)$ denotes the fraction of the VMs with at least i jobs at time t, that is, $$s_i(t) = \frac{m_i(t)}{M(t)}.$$

The reference to t in the notation is dropped where the meaning is clear. For brevity, the fraction of machines with at least $T^P$ jobs ($s_{T^P}$) is denoted by $s_P$, and the fraction of machine with at least $T^A$ jobs ($s_{T^A}$) by $s_A$.

Using the above notations, the expected number of jobs in the queues can be expressed as $$\sum_{i=1}^{\infty} s_i(t).$$

Using the notations of Mitzenmacher (2001), the behavior of the Reversed Supermarket Model may be described by the set of differential equations (1-3):

$$m_0 = M(t) \quad (1a)$$

$$\forall i \leq T^P, \frac{dm_i}{dt} = \quad (1b)$$
$$\lambda N((1-s_i(t)+s_P(t))^d - (1-s_{i-1}(t)+s_P(t))^d) - \mu M(t)(s_i(t)-s_{i+1}(t))$$

$$\forall i > T^P, \frac{dm_i}{dt} = \lambda N(s_{i-1}(t)^d - s_i(t)^d) - \mu M(t)(s_i(t)-s_{i+1}(t)) \quad (1c)$$

Equation (1b) describes the system's behavior for cases where $i \leq T^P$. Jobs arrive at the Reversed Supermarket Model at rate $\lambda N$. Upon an arrival of a new user request, it is sent to a VM holding i−1 jobs (where $i \leq T^P$) in case all sampled VMs have either less than i jobs or over $T^P$ jobs, and at least one such VM has exactly i−1 jobs; this event occurs with probability $$(1-s_i(t)+s_P(t))^d - (1-s_{i-1}(t)+s_P(t))^d.$$

The second part of Equation (1b) accounts for the completion of jobs, which occurs at rate $$\mu p_i(t) = \mu M(t)(s_i(t)-s_{i+1}(t)).$$

Arrival of jobs to VMs holding $T^P$ or more jobs follows the behavior of the classic supermarket model, and therefore Equation (1c) is the same as in Mitzenmacher (2001). The remainder of the analysis, showing the existence of a unique solution to these equations, is described as follows:

$$s_0 = 1 \quad (2a)$$

$$\forall i \leq T^P, \frac{ds_i}{dt} = \quad (2b)$$
$$\lambda^{e\!f\!f}(t)((1-s_i(t)+s_P(t))^d - (1-s_{i-1}(t)+s_P(t))^d) - \mu(s_i(t)-s_{i+1}(t))$$

$$\forall i > T^P, \frac{ds_i}{dt} = \lambda^{e\!f\!f}(t)(s_{i-1}(t)^d - s_i(t)^d) - \mu(s_i(t)-s_{i+1}(t)) \quad (2c)$$

Normalizing the set of equations (1a-1c) by M(t) yields the set of equations (2a-2c). The latter set of equations will now be employed for analyzing the service performance under this model.

Lemma 1.

The Reversed Supermarket Model system is stable for any finite $T^P$ and every $\lambda$ satisfying $\lambda^{e\!f\!f}(t) < \mu$.

Proof.

The lemma follows directly from the stability of the (classic) supermarket model system, because whenever a sampled VM has $T^P$ or more jobs, preference is given to shorter queues.

Notably, the above result does not hold for an infinite $T^P$ (that is, a task assignment policy that always prefers the longest queue).

Analysis of the set of expressions (2a-2c) is now performed. Specifically, the interest is in finding the system's steady state, where, for every i, $$\frac{ds_i}{dt} = 0.$$

Summing an infinite series of these equations, and taking into account that $$lim_{i \to \infty} s_i(t) = 0$$

yields the following:

$$s_1 = \lambda^{e\!f\!f},$$

which is a rather intuitive result that indicates that the arrival rate to the system is equal to the departure state (i.e., the system is work-preserving when working within its stability boundaries).

$$\begin{cases} \tau(0) = 0 \\ \tau(i) = \lambda^{e\!f\!f} \cdot \left((1-\lambda^{e\!f\!f}+s_K+\tau(i-1))^d - s_K^d\right) \end{cases} \quad (3)$$

$$\begin{cases} s_0 = 1 \\ s_i = \lambda^{e\!f\!f} - \tau(i-1) \end{cases} \quad (4)$$

To state the solution to Equation (2b), it is first defined, in Equation (3), the following recursive function $\tau$. Using $\tau$, the solution to Equation (2b) is stated, when $$\frac{ds_i}{dt} = 0,$$

in Equation (4). It can be shown, through a simple substitution, that $\tau(\cdot)$ solves $$\frac{ds_i}{dt} = 0$$

for $i \leq T^P$.

Using Equation (4), a polynomial expression based on $s_P$ only can now be defined, formally:

$$P(T^P, s_P) = \lambda^{e\!f\!f} - \tau(T^P-1) - s_P.$$

This polynomial is of degree P·d. Next, it is proven that $P(T^P, s_P) = 0$ has a single solution in [0,1] for any value of $T^P$. First, some properties of $P(T^P, s_P)$ are established.

Lemma 2.

For every load $\lambda^{e\!f\!f}$, $0 < \lambda^{e\!f\!f} < 1$, every $T^P > 0$ and every number of copies d, d>0, $P(T^P, 0) > 0$.

Proof.

To prove this lemma, it is sufficient to prove that for every load $\lambda^{e\!f\!f}$, $0 < \lambda^{e\!f\!f} < 1$, every $T^P > 0$ and every number of copies d, d>0, $\tau(T^P-1) < \lambda$ for the case of $s_P = 0$. This is proven by showing, by induction on i, that for every load $\lambda^{e\!f\!f}$, $0 < \lambda^{e\!f\!f} < 1$, every $T^P > 0$ and every number of copies d, d>0, $\tau(i) < \lambda^{e\!f\!f}$ for the case of $s_P = 0$. Base: for i=0, the claim holds by the definition of $\tau(\cdot)$. Step: for i=m, assuming $\tau(m-1) < \lambda^{e\!f\!f}$, one gets $$\tau(m) = \lambda^{e\!f\!f}((1-\lambda^{e\!f\!f}+s_P+\tau(m-1))^d - s_P^d) = \lambda^{e\!f\!f}((1-\lambda^{e\!f\!f}+\tau(m-1))^d) < \lambda^{e\!f\!f}((1-\lambda^{e\!f\!f}+\lambda^{e\!f\!f})^d) = \lambda^{e\!f\!f},$$

and the lemma follows.

Lemma 3.

For every load $\lambda^{eff}$, $0<\lambda^{eff}<1$, every $T^P>0$, every number of copies d, d>0, and every i≥0, $\tau(i)\geq 0$ for any value of $s_P$ in [0,1].

Proof.

By induction on i. Base: for i=0, the claim holds by the definition of $\tau(\cdot)$. Step: for i=m, assuming $\tau(m-1)\geq 0$, one gets $$\tau(m)=\lambda^{eff}((1-\lambda^{eff}+s_P+\tau(m-1))^d-s_P^d)\geq \lambda^{eff}((1-\lambda^{eff}+s_P)^d-s_P^d)\geq \lambda^{eff}((s_P)^d-s_P^d)\geq 0,$$

and the claim follows.

Corollary 1.

For every load $\lambda^{eff}$, $0<\lambda^{eff}<1$, every $T^P>0$ and every number of copies d, d>0, $P(T^P, 1)<0$.

Proof.

The corollary follow directly from Lemma 3 and the structure of $P(T^P, s_P)$.

Corollary 2.

For every load $\lambda^{eff}$, $0<\lambda^{eff}<1$, every $T^P>0$ and every number of copies d, d>0, $P(s_P, T^P)=0$ has at least one solution in [0,1].

Lemma 4.

For every load $\lambda^{eff}$, $0<\lambda^{eff}<1$, every $T^P>0$ and every number of copies d, $$d>0, \frac{\partial P(s_P, T^P)}{\partial s_P} > 0$$

for any value of $s_P$ in [0,1].

Proof.

First, it is noted that $$\frac{\partial P(s_P, T^P)}{\partial s_P} = 1 + \frac{\partial \tau(T^P-1)}{\partial s_P}.$$

Therefore, it is sufficient to prove that $$\frac{\partial \tau(i)}{\partial s_P} \geq 0.$$

This is proven by induction on i. Base: for i=0, the claim holds by the definition of $\tau(\cdot)$. Step: for i=m, assuming $$\frac{\partial \tau(i)}{\partial s_P} \geq 0,$$

one gets $$\frac{\partial \tau(i)}{\partial s_P} = \lambda^{eff} d\left((1-\lambda^{eff}+s_P+\tau(i-1))^{d-1} \cdot \left(1+\frac{\partial \tau(i-1)}{\partial s_P}\right) - s_P^{d-1}\right).$$

And so, it is now shown that $$s_P^{d-1} \leq (1-\lambda^{eff}+s_P+\tau(i-1))^{d-1} \cdot \left(1+\frac{\partial \tau(i-1)}{\partial s_P}\right).$$

By the inductive assumption, it holds that $$s_P^{d-1} \leq (1-\lambda^{eff}+s_P+\tau(i-1))^{d-1}.$$

Next, using Lemma 3 one gets $$s_P^{d-1} \leq (1-\lambda^{eff}+s_P)^{d-1},$$

and the claim follows.

Theorem 1.

For every load $\lambda^{eff}$, $0<\lambda^{eff}<1$, any $T^P>0$ and every number of copies d, d>0, $P(T^P, s_P)=0$ has a single solution in [0,1].

Proof.

First, recall that Corollary 2 shows that $P(T^P, s_P)=0$ has at least one solution in [0,1]. In addition, Lemma 4 indicates that the derivate of $P(T^P, s_P)$ is positive in [0,1], and the theorem follows.

Leveraging Theorem 1, simple analysis techniques (such as binary search) can be employed to find $s_P \in [0,1]$ such that $P(T^P, s_P)=0$. Given the value of $s_P$ (for certain threshold, load and number of copies), one can compute the values of $s_i$ and $p_i$.

Figure 3:
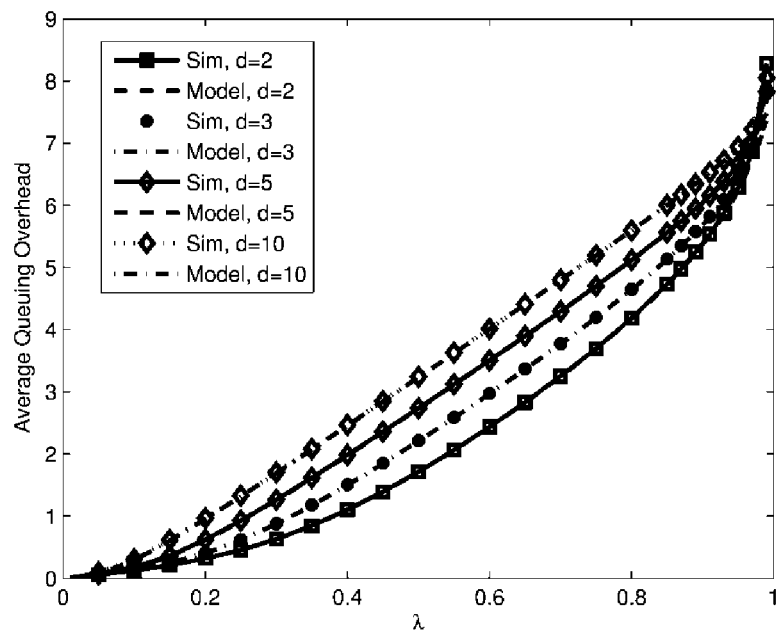
FIG. 3 shows the average queuing overhead as a function of the system load $\lambda$, as predicted by a model of the architecture and measured in simulations.

In order to validate the static system model, FIG. 3 presents the average queuing overhead as a function of the system load as predicted by the present configuration and measured in simulations. An in-house simulator was used. The simulation setup included 100 users and VMs (N=M=100), $T^P=8$, and 1,000,000 jobs, and each point in the graph is an average taken over 50 runs. The figure shows that the average queuing overhead grows with the load, but remains below the threshold except for very high loads, namely except for $\lambda>0.97$. Furthermore, the figure shows that the model predicts the system's behavior at a fairly high accuracy, as the results are identical to the extent of 2%, aside from the case of $\lambda=0.99$, where the model differs from the simulation results by 7%.

Figure 4:
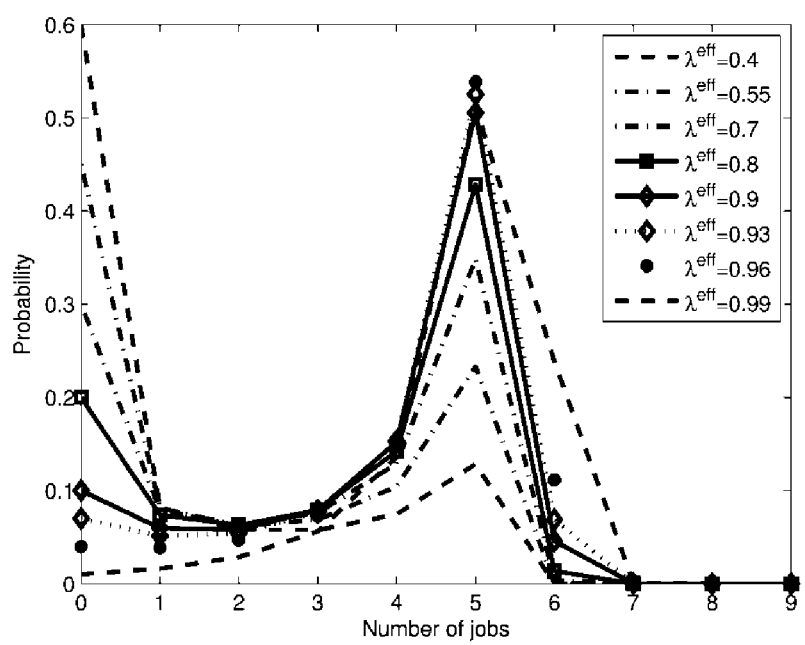
FIG. 4 shows the probability of a VM holding a certain number of jobs for different values of $\lambda^{eff}$.

FIG. 4 depicts the probability of a VM holding a certain number of jobs for different values of $\lambda^{eff}$ based on the model when the threshold $T^P$ is set to 5 and the number of sampled servers d is 5. The figure shows that the method effectively packs servers towards the threshold as the load increases, and is able to keep them close to that threshold. It also shows that the probability of a VM to hold a number of jobs greater than the threshold quickly diminishes when the number of jobs grows beyond $T^P$. Only for very high loads, i.e., $\lambda^{eff} \geq 0.9$, do we see a significant probability (0.05 or higher) for a server to hold a number of jobs greater than the threshold. Note, however, that in the dynamic system setup, the VM management policy is expected to terminate under utilized VMs, driving $\lambda^{eff}$ to a high value, as demonstrated through the experiments described below. It is therefore prudent for the service provider to set the value of $T^P$ when taking into account that the VMs would operate under high effective loads.

Figure 5:
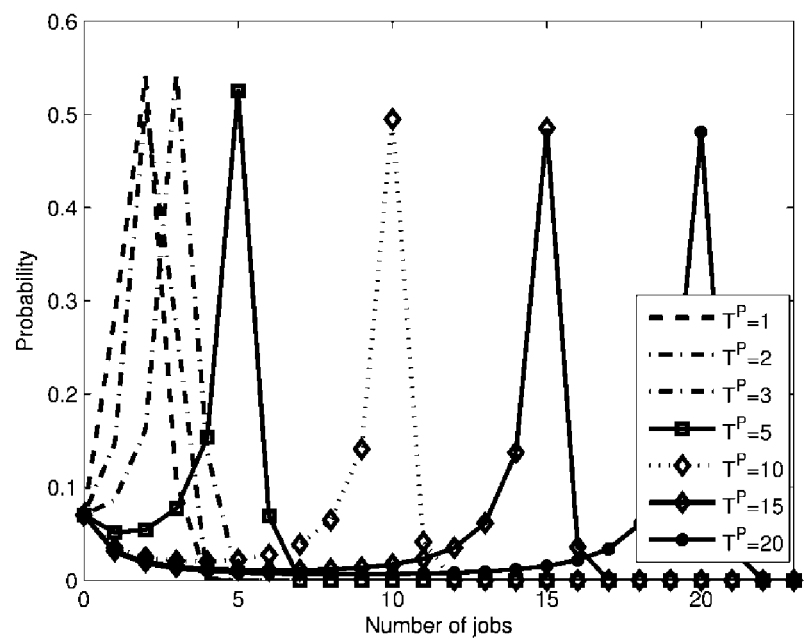
FIG. 5 shows the probability of a VM holding a certain number of jobs for different operational thresholds.

FIG. 5 depicts the probability of a VM holding a certain number of jobs for different thresholds based on the model when the number of sampled VMs d is 5 and the effective load $\lambda^{eff}$ is 0.93. FIG. 5 also shows the effectiveness of our method in packing the VMs towards the threshold, while minimizing the probability of VMs holding more jobs than the threshold.

Figure 6:
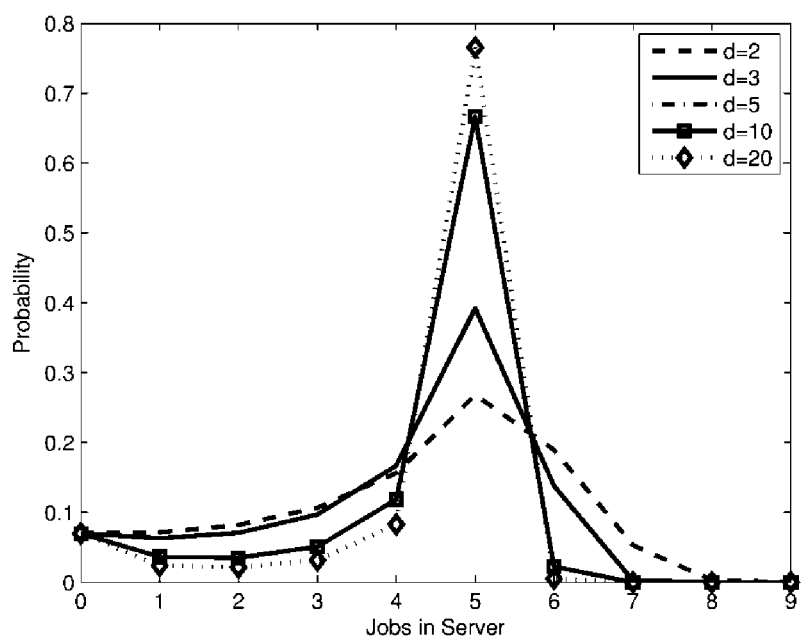
FIG. 6 shows the probability of a VM holding a certain number of jobs for different values of the number of sampled VMs.

FIG. 6 depicts the probability of a VM holding a certain number of jobs for different values of the number of sampled VMs d based on the present model when the threshold $T^P$ is set to 5 and the effective load $\lambda^{eff}$ is 0.93. This figure shows that the effectiveness of the present architecture grows with the number of sampled VMs.

The above figures indicate that the present architecture is successful at "packing" VMs with $T^P$ jobs, driving $s_P$ to a (relatively) high value. It would therefore be prudent for the service provider to set $T^A>T^P$.

The major caveat of the static model is that the number of idle VMs is fixed (i.e., it is always $(1-\lambda^{eff})M$), but one cannot shut them down. However, this model can still be used to evaluate the probability that the arrival of a job would trigger the activation of a new VM. Recall that, when all d sampled VMs hold $T^A$ or more jobs, a new VM is activated (and the job is sent to the least loaded among the d sampled VMs). The probability of all d sampled servers to hold $T^A$ or more jobs upon the arrival of a new user request is $s_A^d$.

Figure 7:
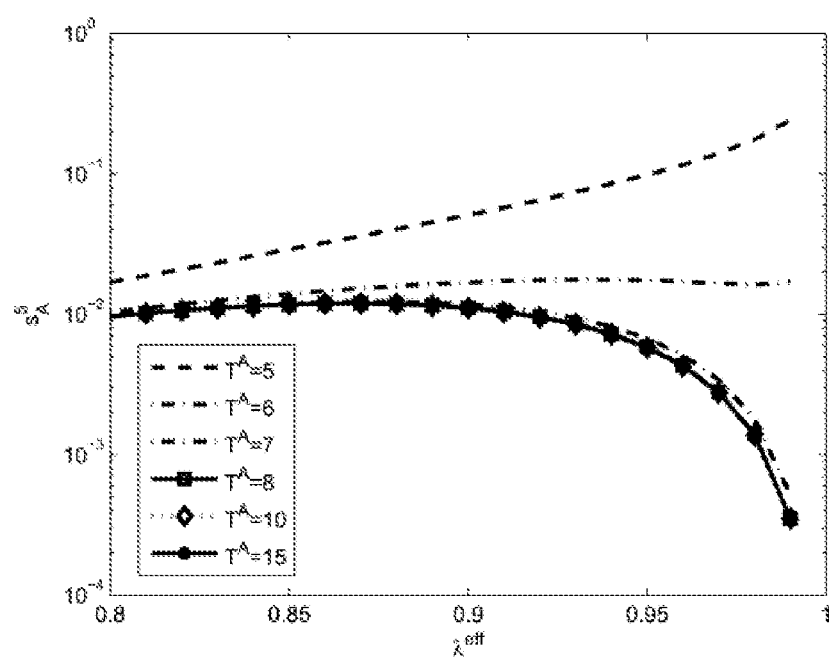
FIG. 7 shows the probability that an arriving job would trigger the activation of a new VM.

FIG. 7 depicts the probability that an arriving job would trigger the activation of a new VM based on the present model. High loads are focused, as the dynamic system is expected to operate at that region. The figure shows that setting $T^P=T^A$ induces a high rate of VM activation when under high load (namely, up to 10% of arriving jobs would trigger the activation of a new VM), creating significant churn (VM activation and termination) in the system. Once $T^A$ is set to higher values, the VM activation probability drops, and it is well within 1% when $T^A \geq T^P+2$. Also noted is that when increasing $T^A$ to much higher values, the VM activation probability remains the same. Finally, it is commented that the value of $T^A$ has significant implications on the capability of the dynamic system to adapt in case of changes in the load. In particular, setting $T^A$ to a high value would imply that the system is not very sensitive to load changes, triggering a significant amount of SLA violations if $T^A$ is too high.

Dynamic System

A discussion is now made of a dynamic system operative according to the present architecture. The VM management policy in such a system may follow the server behavior policy defined in Gandhi (2012), i.e., once a VM becomes idle, it sets a timer for $t_{wait}$ time units. If no jobs arrive at this VM during this time, the VM self-terminates. If a job arrives at the VM before the timer expires, the VM resumes normal work and processes the job. A new VM is instantiated when a job arrives at the system, and all the d sampled VMs hold $T^A$ or more jobs.

Figure 8A:
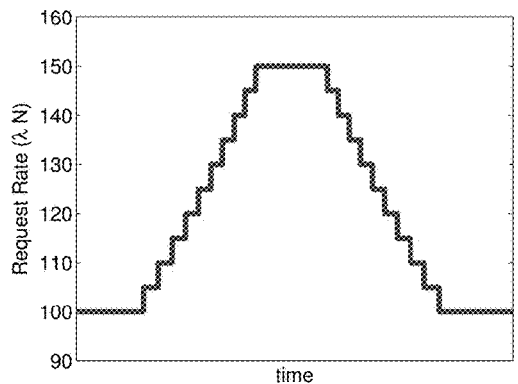
FIGS. 8A-8F show different arrival patterns of jobs, where
Figure 8D:
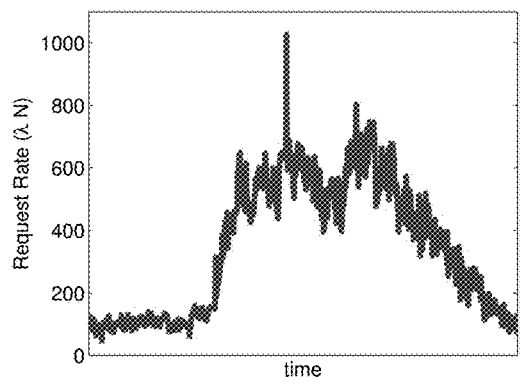
Figure 8B:
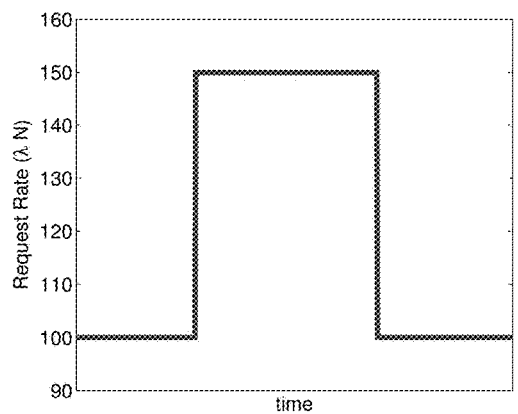
Figure 8E:
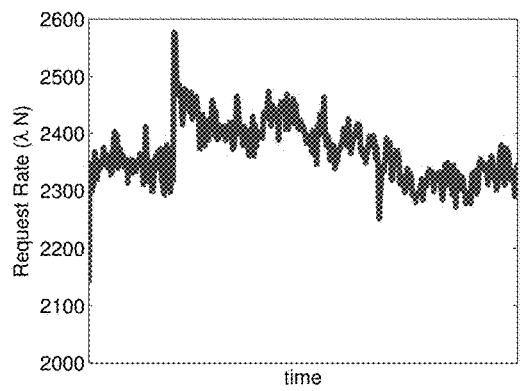
Figure 8C:
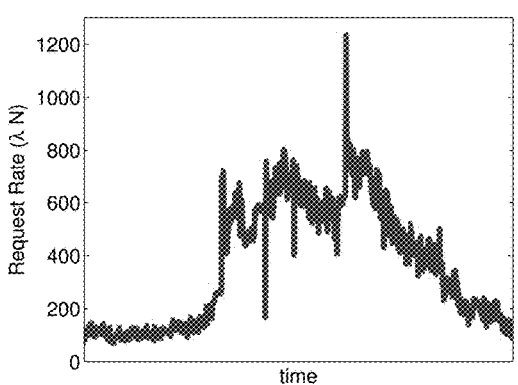
Figure 8F:
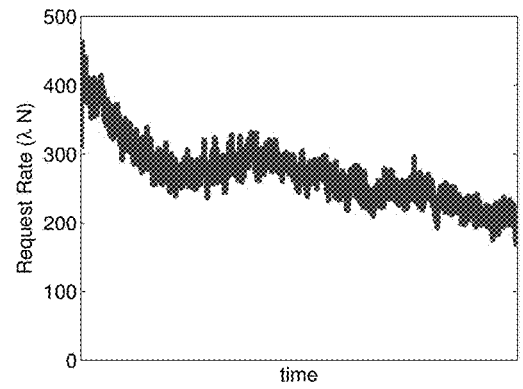

The experimental setup: the present architecture was tested based on a wide range of workloads. Three synthetic workloads were used, demonstrating system behavior under a fixed load, a gradually changing load, and a sharply changing load. These loads are used to demonstrate some of the phenomena observed when running the present architecture. FIG. 8A shows the system behavior under the gradually changing load, while FIG. 8A shows the system behavior under a sharply changing load. These two Figures depict the different arrival patterns (excluding the synthetic fixed load).

In addition, the architecture was tested based on HTTP traces from three different origins: traces of 8,528,088 user requests to Wikipedia collected on October 2007, obtained from WikiBench—Wikipedia Access Traces. http://www.wikibench.eu/?page id=60. Last accessed Oct. 26, 2013 (shown in FIG. 8E); traces of the North Carolina Research Triangle Park (RTP) collected on Oct. 9 and 10, 2007, with 3,176,785 and 2,986,113 user requests, respectively, obtained from IRCahce. http://www.ircache.net/. Last accessed: Oct. 26, 2013 (shown in FIGS. 8C and 8D, respectively); and a trace of 7 million user requests made to the 1998 World Cup website on Jul. 9, 1998 (shown in FIG. 8F). These four Figures, namely—FIGS. 8E, 8C, 8D and 8F, depict different arrival patterns (excluding the synthetic fixed load).

The workloads described above only determine the arrival sequence of the requests. In order to determine the processing time of user requests, a workload that mimics the behavior of a social network site, such as Facebook, was designed. A Redis (see http://redis.io, Last accessed Oct. 26, 2013) key-value store with 10 GB of RAM was instantiated on an Amazon EC2 m2.xlarge instance. This Redis key-value store behaves as a memcached server. Ten million entries were inserted into the Redis store, where the value for each key is a list of additional keys.

Figure 9A:
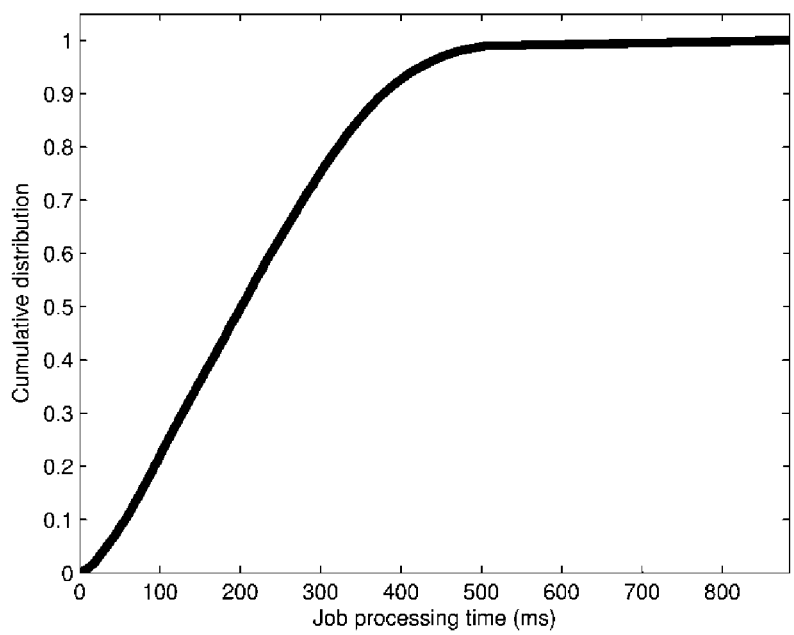
FIG. 9A shows a cumulative distribution of job processing times used in simulations.

Similar to Gandhi (2012), to mimic a job, the server was accessed from a different EC2 instance. A user request begins with a query to the Redis server to obtain the value for some randomly chosen key. The result of the query is a list of additional keys. The process continues iteratively to obtain the values of the obtained keys. The number of iterations was set such that the average number of keys obtained in a single user request is, on average, 2,500 keys. The time required to complete a user request highly varies, where the minimum measured time is below 10 ms and the longest time is 900 ms. The average request processing time is 200 ms. The cumulative distribution of job processing times is depicted in FIG. 9A.

In the simulations, the SLA target was set to 10 times the average request processing time, i.e., 2 seconds. To meet this requirement, the packing threshold, $T^P$, was set to 5 and the VM activation threshold, $T^A$, to 8. It is assumed that 120 seconds are required from the time that a request to instantiate a new VM is issued till the time the new VM is ready to process user requests. This value is based on the EC2-based experiments described below and is corroborated by Mao (2012).

Results: Synthetic Arrival Patterns

Figure 10A:
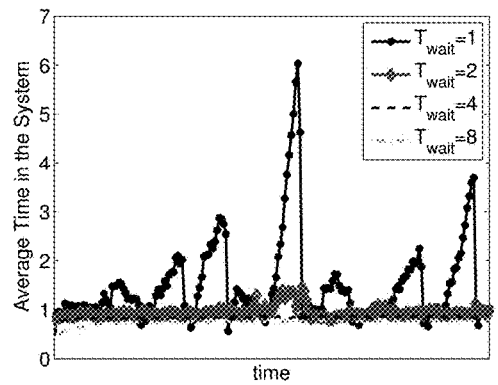
FIGS. 10A-10D show the effect the value of $t_{wait}$ has on the system's average response time and the number of active VMs.
Figure 10C:
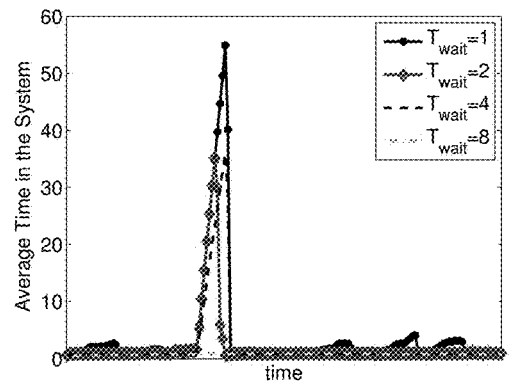
Figure 10B:
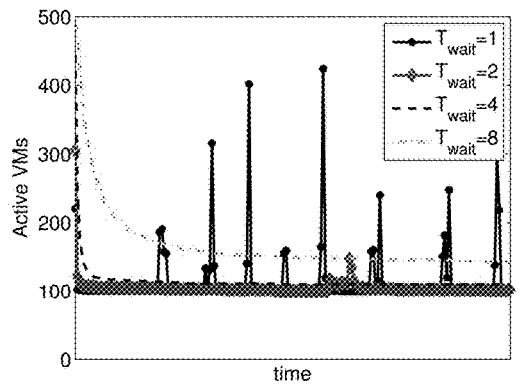
Figure 10D:
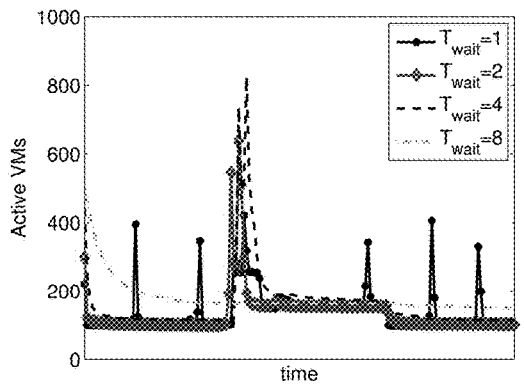

First, the issue of setting the right value of $t_{wait}$ is addressed. FIGS. 10A-10D depict the effect the value of $t_{wait}$ has on the system's average response time and the number of active VMs. In a Pay-As-You-Go model, the number of active VMs is proportional to the operational cost of the service. If $t_{wait}$ is set to a too low value, the system shows signs of instability. For example, in FIG. 10B, the number of active VMs when $t_{wait}=1$ highly fluctuates even though the arrival rate is fixed. On the other hand, setting $t_{wait}$ to a high value implies that a high number of VMs would be kept active, while no significant improvement in performance is observed. For example, FIG. 10C shows that setting $t_{wait}$ to either 4 or 8 yields similar performance (in terms of average time in the system) while FIG. 10D shows that in the case of $t_{wait}=8$ almost twice as many VMs are active. This is because in case of high $t_{wait}$ many VMs are kept active but idle, and would, occasionally, receive a job that would prevent them from shutting down. Setting $t_{wait}$ to the right value has a crucial role in mitigating load changes. Accordingly, in the RTP traces, which show higher instability, $t_{wait}$ is set to 8, while in all other cases it is kept at 4. It was chosen to keep $t_{wait}$ set to 4 even for the synthetic patterns that exhibit load changes, to demonstrate some of the related phenomena.

Figure 11:
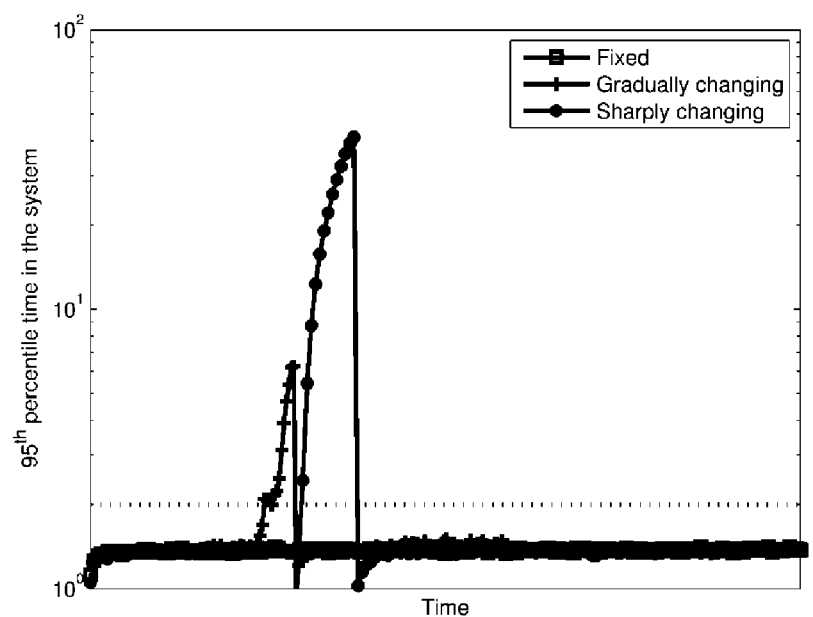
FIG. 11 shows the $95^{th}$ percentile of response time in the simulations.

The different aspects of the system's performance under variable loads are now discussed. FIG. 11 depicts the $95^{th}$ percentile of response time, i.e., in each time slot of 10 seconds in simulation, 95% of all jobs completed in time below the line. In addition, the SLA is marked with a black dashed line. It is easy to see that when the system is at steady state the SLA target is fully met. When the load changes, SLA targets are temporarily missed while the service provisions additional VMs and re-stabilizes at a new steady state.

Figure 12:
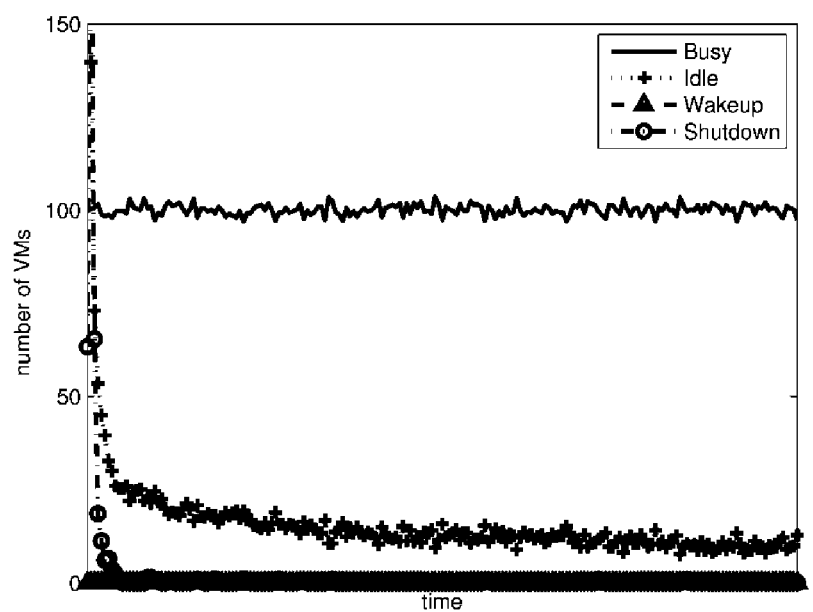
FIG. 12 shows that when an arrival rate is fixed, the system quickly enters a steady state in which the number of active VMs, both busy and idle, adjusts to the load and does not change.
Figure 14A:
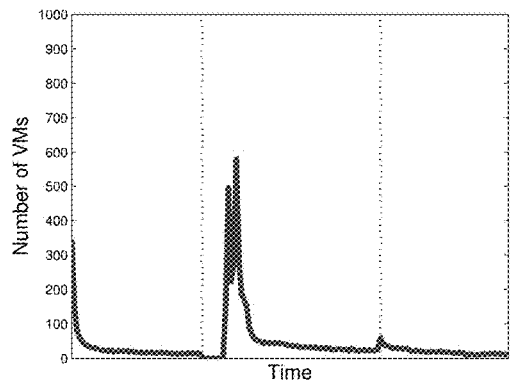
FIGS. 14A-14D show the state of the deployed VMs under the sharply changing arrival rate pattern.
Figure 14C:
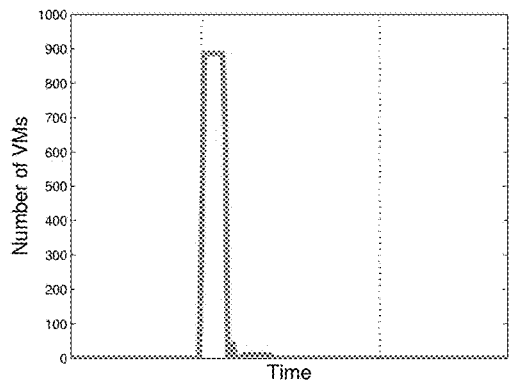
Figure 14B:
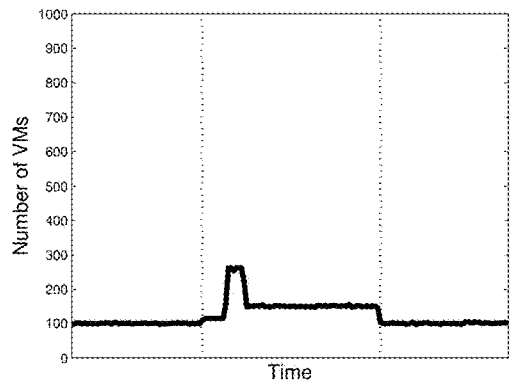
Figure 14D:
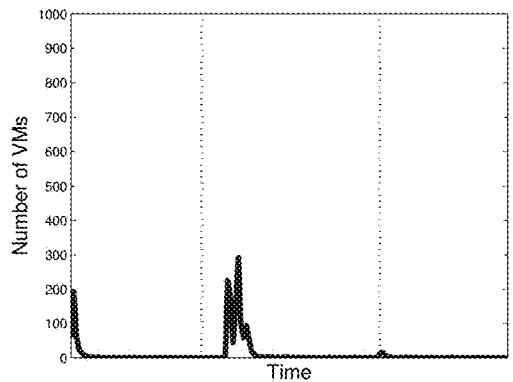

Next, the cost, or the number of deployed VMs and their state, is examined. When the arrival rate is fixed (see FIG. 12) the system quickly enters a steady state in which the number of active VMs, both busy and idle, adjusts to the load and does not change. FIGS. 13A-13D depict the state of the deployed VMs under the gradually changing pattern (in this figure vertical dotted lines show the times in simulations where the load changes). When the load starts to rise, the idle VMs are sufficient to contain the new arrival rate and so the number of active VMs does not change. At some point the system can no longer retain service level under the rising load, and a surge of new VMs is instantiated. At the peak, almost 900 VMs are in wakeup mode. Once part of these VMs become available, the system returns to steady state under the new load. A similar phenomena occurs when running the sharply changing arrival rate pattern as depicted in FIGS. 14A-14D. Once the load changes (rising by 50%) a multitude of new VM are instantiated. Most of these VMs self-terminate shortly after becoming active.

The phenomena described above, i.e., the instantiation of a large number of VMs in face of a load rise, is sometimes undesirable and originates from the distributed nature of the architecture. As users are unaware of the existence of VMs in wakeup mode, they request the instantiation of yet another VM when sampling d overloaded VMs. Two methods may mitigate this behavior. The cloud provider, as it controls the instantiation of new VMs for a service, can limit the growth. Alternatively, the users may be granted access to query the number of pending VMs for a specific service. The option of determining the number of pending VMs for a specific service is already supported through the AWS SDK, as described below. In some embodiments, growth limit policies are applied, in terms of number of VMs, relative size of VMs with respect to the number of already running VMs, or a combination of both.

Figure 15:
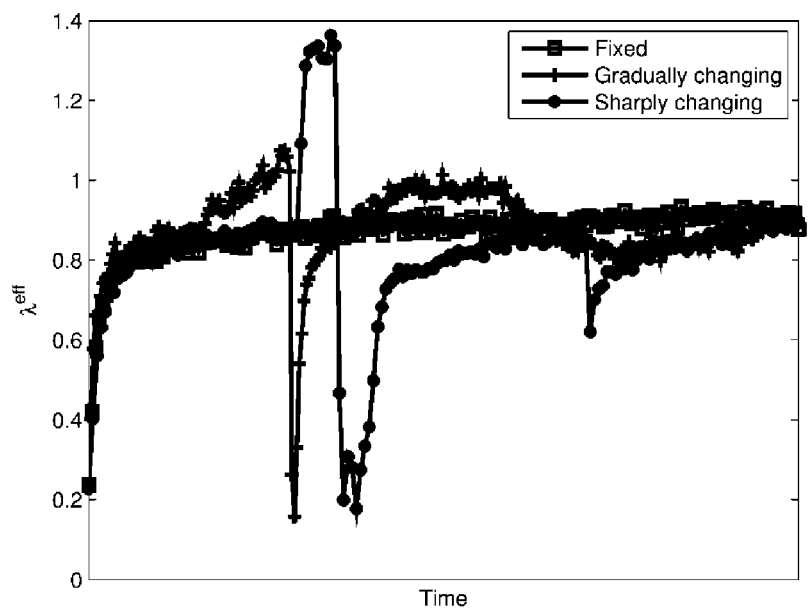
FIG. 15 shows the effective load on the system, i.e., the ratio between the accumulated processing load and the system's processing capacity.

FIG. 15 depicts the ratio between the number of user requests and the number of active VMs. In each time epoch, the average number of active VMs, M(t), and the total amount of work (the sum of all job processing times), W(t), are computed. The effective load is calculated as $$\lambda^{eff} = \frac{W(t)}{M(t)}.$$

The figure shows that, whenever the system is stable, it operates under an effective load of roughly 0.9. Whenever the load rises, so does the effective load. When the system becomes unstable, the effective load rises to a value greater than 1. These points correspond to the times in simulation when multiple new VMs are instantiated. Shortly after that, once the new VMs become available, the effective load drops.

Results: Real HTTP Traces

Figure 16:
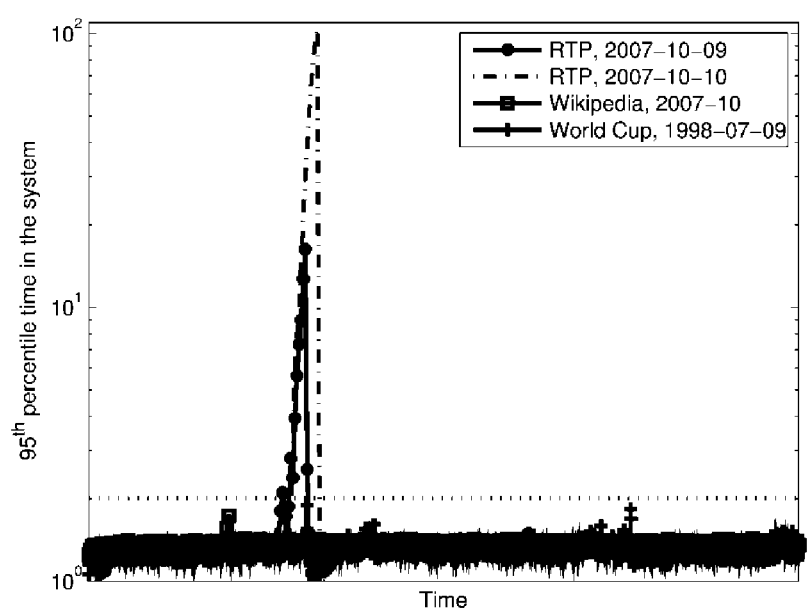
FIG. 16 shows the $95^{th}$ percentile of response time in the simulated real HTTP traces data.

The simulated real HTTP traces data is now discussed. FIG. 16 depicts the 95$^{th}$ percentile of response time. As in the case of the synthetic patterns, the present architecture is able to meet the SLA and keep response time below 2 seconds. For each of the RTP traces, a single significant violation can be observed. These violations correspond to a time in the trace where, over a very short period of time, the demand for the service more than triples.

Figure 17A:
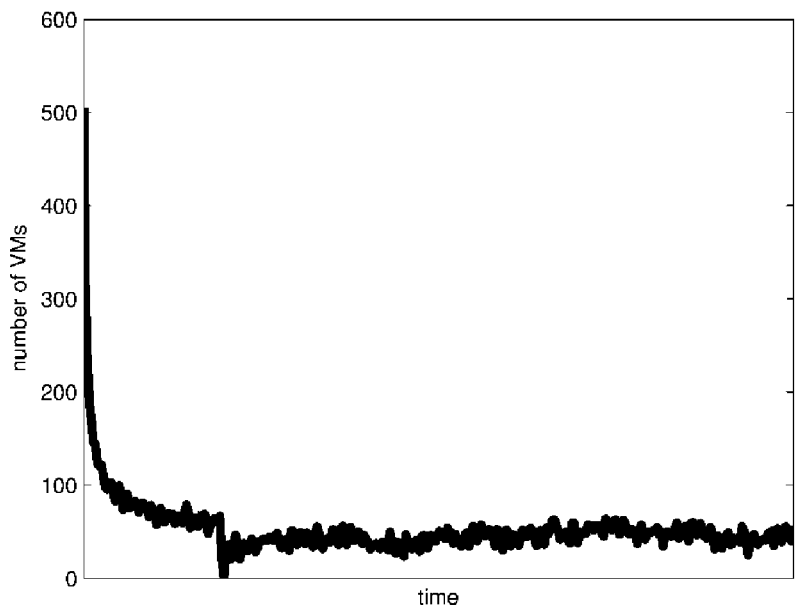
FIGS. 17A-17B show VM states when running with the Wikipedia trace.
Figure 17B:
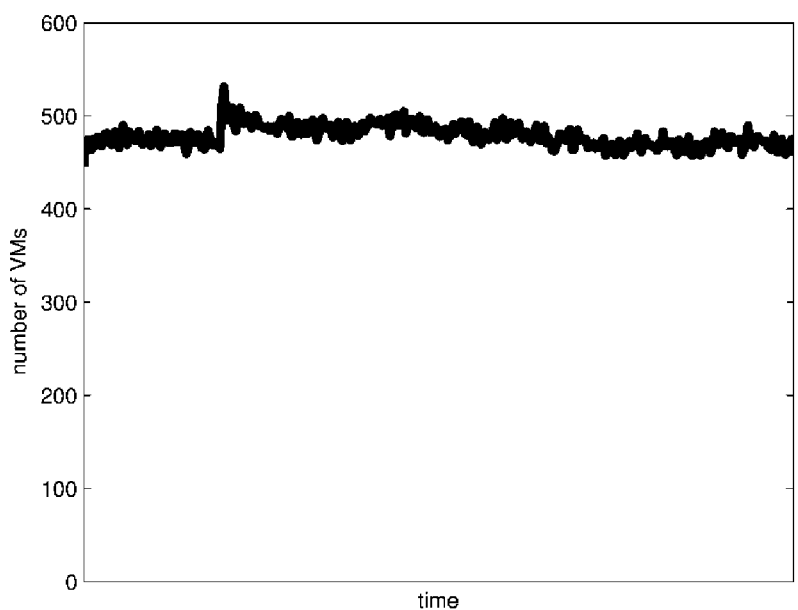
Figure 18A:
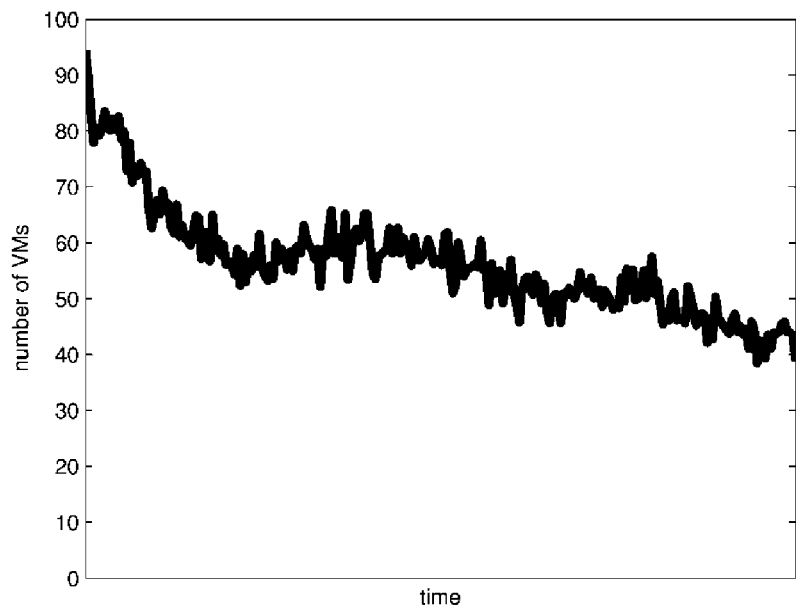
FIGS. 18A-18B show VM states when running with the World Cup 1998 trace.
Figure 18B:
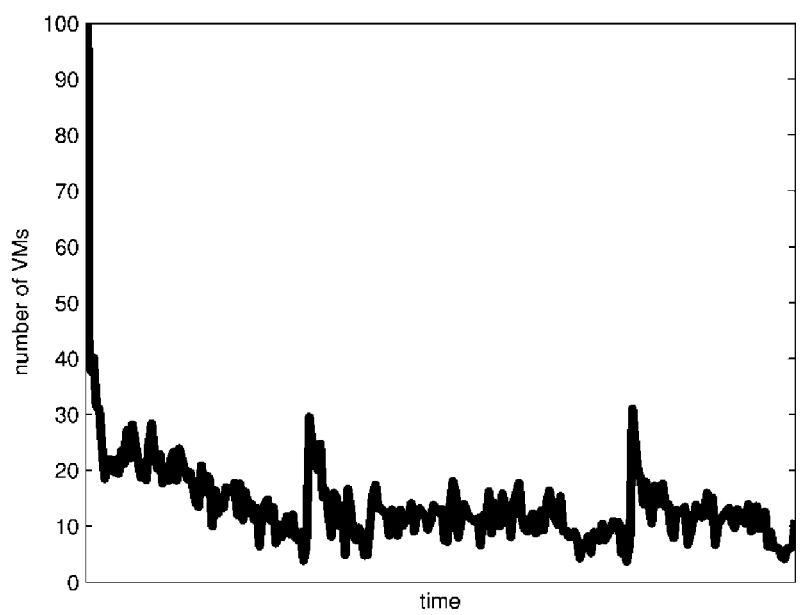
Figure 20A:
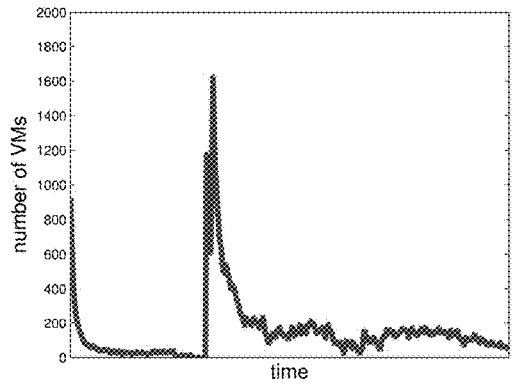
FIGS. 20A-20D show VM states when running with the RTP 2007-10-10 trace.
Figure 20C:
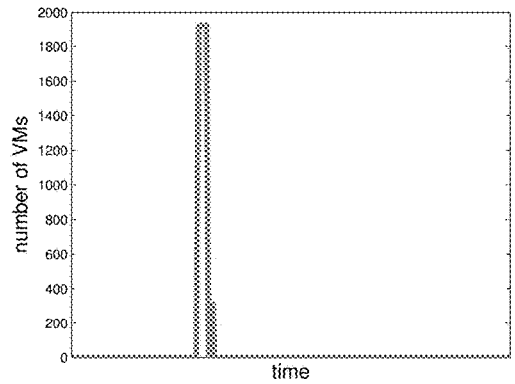
Figure 20B:
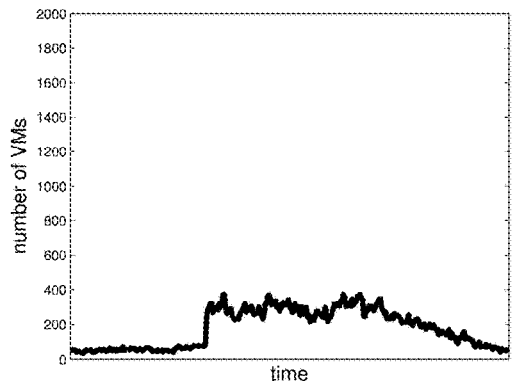
Figure 20D:
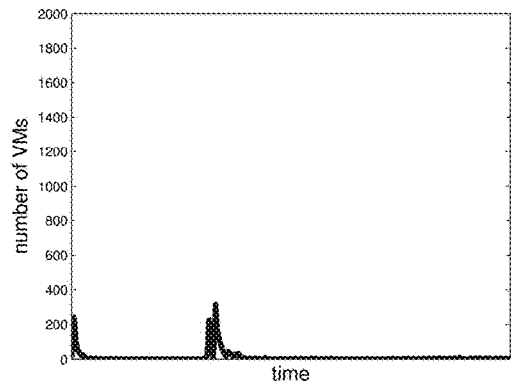

FIGS. 17A-17B (VM states when running with the Wikipedia trace), FIGS. 18A-18B (VM states when running with the World Cup 1998 trace), FIGS. 19A-19D (VM states when running with the RTP 2007-10-09 trace) and FIGS. 20A-20D (VM states when running with the RTP 2007-10-10 trace) depict the number of VMs at different states as a function of time in simulation for the HTTP traces. As expected, the number of active VMs (busy plus idle) adjusts to the load with the different load variation. The major changes in load occur when running the RTP traces trigger the instantiation of almost 2000 new VMs, almost all of which self terminate shortly after becoming available.

Altogether, the evaluation indicates that the present architecture may guarantee the required SLA while adjusting the number of active VMs as needed by the workload, thus keeping the cost low. Moreover, this behavior is robust and can be achieved with little or no parameter fine-tuning.

Exemplary Implementation

To demonstrate the effectiveness of the present architecture, such a system was implemented and its performance tested in the Amazon EC2 environment. This implementation included two major pieces: a server mimicking the behavior of a service VM, and a combined component representing the client and the EALB. This component also managed the experiment and collected log data. A dedicated EC2 Amazon Machine Image (AMI) was created, that, once instantiated, boots and runs the server.

The server comprised of four components: an execution component that performs user requests; a queuing component that receives user requests and queues them; a load-query component that answers client load queries; and a self-termination component that determines if and when a server should terminate.

Figure 9B:
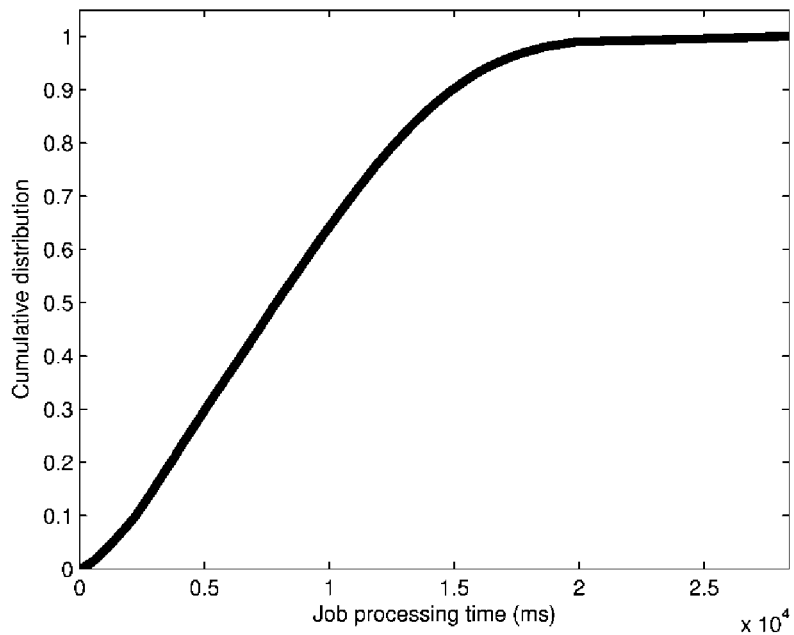
FIG. 9B shows a cumulative distribution of job processing times in the EC2 tests.

(1) Execution Component: this is the component that performs user requests. When a new job arrives, this component dequeues and processes it. The processing of a job is implemented by a simple busy-wait loop, where the duration of the wait is based on the Redis key-value store measurements described above. For practical reasons, namely, that the client will not become the bottleneck of the evaluation, the number of iterations for which additional keys are requested was increased. The resulting processing times follow a similar distribution in shape, depicted in FIG. 9B but on a different scale. The average uninterrupted processing time is 8.3 seconds, where the minimum measured time is below 10 ms and the longest time is 28.4 seconds.

(2) Queuing Component: this component waits for job requests. Upon such a request, this component places it in the queue. In case the Execution Component is idle, the Queuing Component notifies it so that the job would go into processing.

(3) Load-query Component: this component listens for client load queries. Whenever a load query is received, the Load-Query Component samples the length of the queue and sends this value as an answer.

(4) Self-termination Component: this is the component that determine when the server should self terminate. It sets a timer for $t_{wait}$ seconds. Whenever a new job arrives, the timer is reset to its initial value. In case the timer reaches 0, this component initiates self termination. Self-termination begins with the de-registration of the running VM from the service. Note that in order to make sure that no jobs are lost, after the de-registration message has been sent, the self-termination component stalls the execution of the VM termination code by 3 more seconds. In case a new job has been received during this time, self-termination is aborted and the server processes the job. No re-registration of the VM to the service is done in such a case, hence, once the de-registration notification propagates in the system, clients would stop sending the VM new jobs, and self-termination will complete. Self-termination itself is accomplished by sending the EC2 service a request to terminate accompanied with the VM's id.

The entire server is implemented in Java, where each component is implemented as a Java thread.

This implementation resembles the architecture depicted in FIG. 2 with one important simplification, namely: to simplify the management of the experiments, a single EALB was launched. This dedicated EALB is augmented with a workload generation component that creates user requests and sends them according to the required workload pattern. When required by the present architecture, the EALB launches a new VM on an EC2 m1.small instance. This component also gathers responses and produces logs that were processed to create the system statistics.

As discussed above and due to the EC2 instance limit, a new VM could not be spawned whenever it was required. Therefore, a growth limit policy was adopted, limiting the number of pending instances to 20% of the number of active instances. To implement the above policy, the EALB needs to determine, when required, the number of active VMs and the number of pending VMs. Obtaining this data is supported through the EC2 SDK. A code snippet demonstrating how to accomplish this task is shown herein:

```
private int countInstancesInState(String amiId, String state) {
  int result = 0;
  List<Reservation> reservList = ec2.describeInstances( ).getReservations( );
  for (Reservation r : reservList) {
    List<Instance> instanceList = r.getInstances( );
    for (Instance i : instanceList) {
      if ((i.getImageId( ).equals(amiId)) &&
          (i.getState( ).getName( ).equals(state)))
      { result++; }
    }
  }
  return result;
}
```

To verify that this implementation captures the same tradeoffs as described above, simulations were further run under the same setup (i.e., with the growth limit policy). Simulation results were identical to the results gathered from the implementation.

The present system was tested with the three synthetic loads described above. For each of these, a load matching the capacity of 60 VMs was started with. Under the fixed load test, the load remains constant throughout the test. In the sharply changing load test, after running for about 2 hours, the load instantaneously rises by 50%. The gradually changing load test starts with 80 at the start load, and then gradually rises in 10 steps to an overall rise of 50%. During each step, the load remains constant for 12 minutes. After running for an additional 80 minutes at the high load, the load begins to gradually descend. Every test is initialized with 65 running VMs and runs for over 7 hours, processing over 200,000 jobs.

All tests run with the same setup as the simulation study, that is, $T^P=5$ and $T^A=8$. $t_{wait}$ and the SLA target were scaled linearly with the average processing time of a job to 160 seconds and 80 seconds, respectively.

Figure 21:
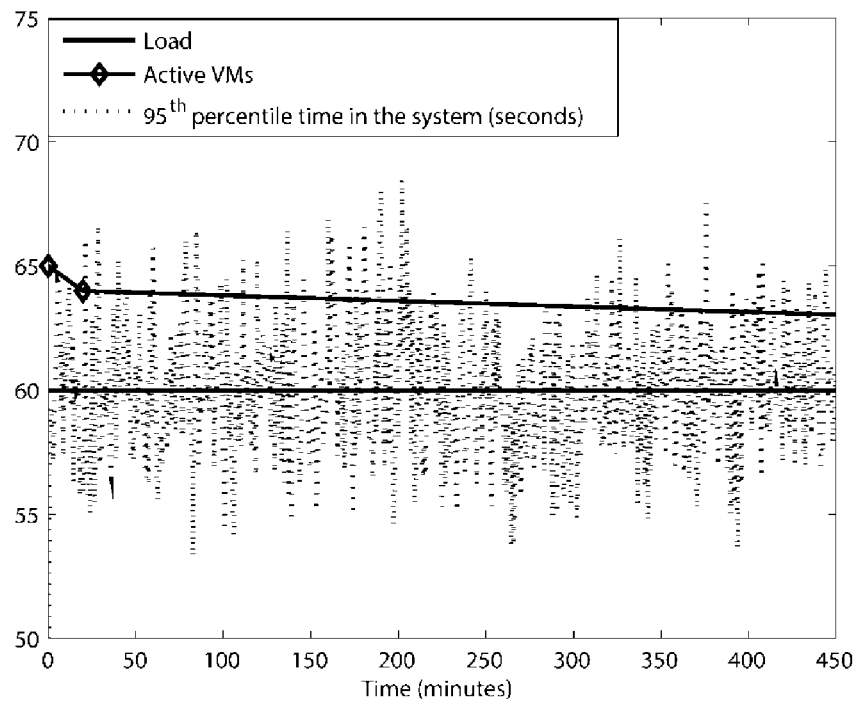
FIG. 21 shows the results of the EC2-based tests for the fixed loads.
Figure 22:
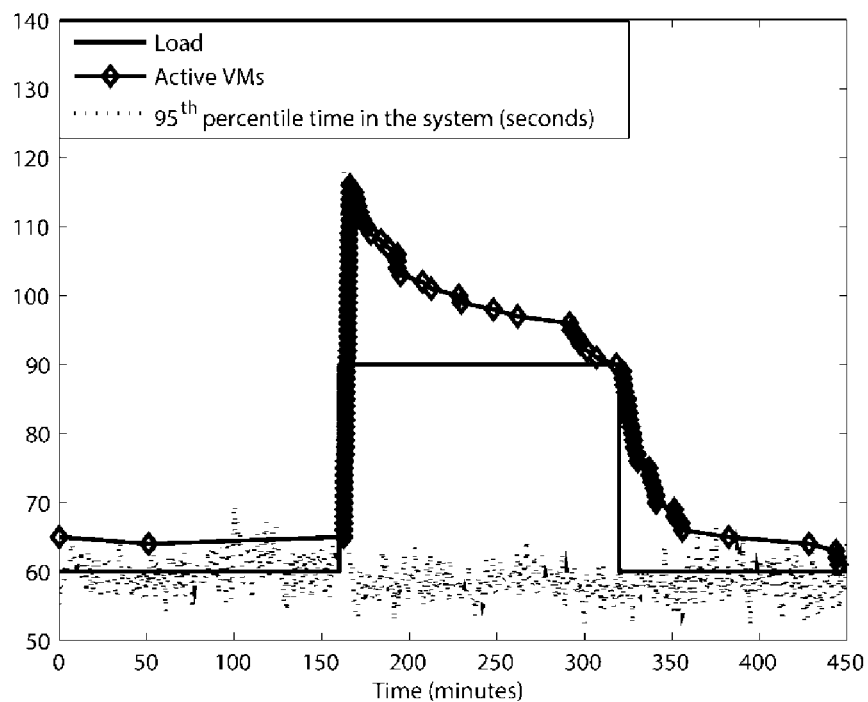
FIG. 22 shows the results of the EC2-based tests for the sharply changing loads.
Figure 23:
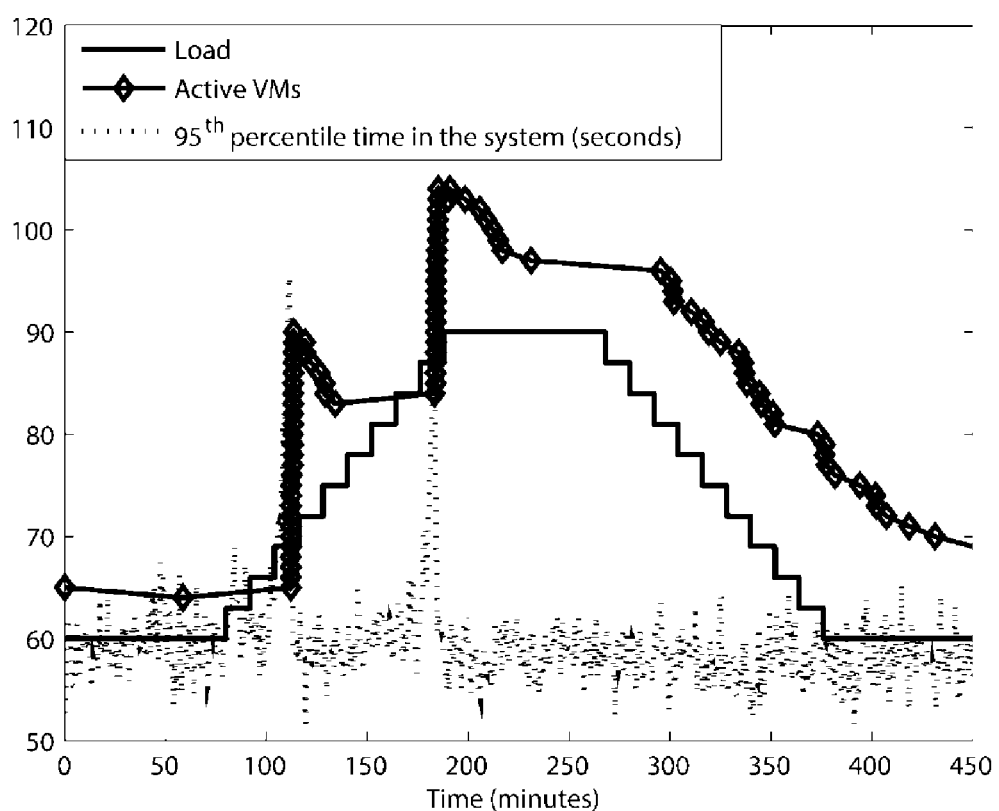
FIG. 23 shows the results of the EC2-based tests for the gradually changing loads.

FIG. 21, FIG. 22 and FIG. 23 depict the results of the EC2-based tests for the fixed, sharply changing and gradually changing loads, respectively. Note that since the VMs are running in the EC2 environment, one cannot distinguish between busy and idle VMs. The number of active VMs (busy plus idle) is logged by tracking the VM registration and de-registration messages.

The results exhibit similar behavior to that observed in the simulations. When the system is running under a steady load, the number of VM stabilizes and the service fully meets the SLA. Under small load rises, the number of active VMs can sustain the changing load, and the response time slightly increases. When the SLA cannot be maintained, either when the load sharply rises or when an incremental rise exceeds the capacity, new VMs are instantiated. At the interim between the instantiation of the VMs and the time they become available, the SLA target cannot be met. When the load decreases, some VMs quickly become idle and self-terminate.

Application to Power Savings

Advantageously, the task assignment policy discussed above may be applied, mutatis mutandis, to a cloud computing system and/or to any system comprising a large number (e.g. dozens, hundreds or more) of physical servers, in order to decrease power consumption in such system. In systems of these type, the power consumption is generally correlated to the number of active physical servers at any given time, namely—to servers which are in operative mode and are consuming electrical current. Hence, an operational policy which maintains only the necessary minimum number of servers active—may decrease overall power consumption.

Those of skill in the art will recognize that, when the terms "job" and "task" (or the more generalized term "load") in the above discussions are replaced with "VM", and when the term "VM" in the above discussion is replaced with "physical server", the result is a VM assignment policy which is lean on power consumption.

This VM assignment policy strives to pack physical servers with as many VMs as possible, while ensuring that the physical servers remain within operational bounds, i.e., that all the requests can be serviced within SLA (Service Level Agreement) requirements.

The VM assignment policy may operate as follows: Upon receiving a request to instantiate a new VM in the system, random ones of the physical servers of the system may be sampled for a load currently handled by each of them. If the load currently handled by the sampled physical servers is within operational bounds, the new VM may be instantiated in one of the sampled physical servers which currently handles the highest load compared to other ones of the sampled physical servers. If, on the other hand, the load currently handled by the sampled physical servers is beyond operational bounds, the new VM is instantiated in one of the sampled physical servers which currently handles the lowest load compared to other ones of the sampled physical servers. Only if he load currently handled by the sampled physical servers is beyond an activation threshold, which is larger than the operational bounds, then a new physical server may be activated. This ensures that the additional power consumption resulting from this activation is only made when absolutely necessary. On the other hand, the packing of VMs in the most highly-loaded physical servers ensures that the least-loaded physical servers will shut down once their VMs finish running, thus saving power.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, in a cloud computing system:
receiving a new job at the cloud computing system;
sampling a randomly-selected subset of all VMs (Virtual Machines) presently running at the cloud computing system for a load currently handled by each of the sampled VMs, wherein the load is a measure of computation burden, and wherein the randomly-selected subset does not include all the VMs presently running at the cloud computing system;

if the load currently handled by each of the sampled VMs is within operational bounds, sending the new job to one of the sampled VMs which currently handles a highest one of the loads;

if the load currently handled by each of the sampled VMs is beyond the operational bounds: (a) sending the new job to one of the sampled VMs which currently handles a lowest one of the loads, and (b) if the load currently handled by each of the sampled VMs is beyond operational bounds by more than an activation threshold, instantiating a new VM in the cloud computing system in order to receive future jobs but not the new job, wherein the activation threshold is at least 10% larger than the operational bounds; and deciding, by each of the VMs presently running at the cloud computing system, when to terminate itself.

2. The method according to claim 1, further comprising applying a growth limit policy to new VM instantiation.

3. The method according to claim 2, wherein the applying of the growth limit policy to new VM instantiation comprises:

limiting a number of VMs in wakeup mode, so as to prevent an instantiation of an undesirably large number of new VMs when the load currently handled by the VMs rises.

4. The method according to claim 1, wherein the deciding is based on running a timer by each of the VMs presently running at the cloud computing system when each of the VMs presently running at the cloud computing system becomes idle.

5. The method according to claim 1, wherein the load is measured by a number of jobs active in each VM of the sampled VMs.

6. The method according to claim 1, wherein the load is measured by a number of open HTTP (HyperText Transfer Protocol) connections in each VM of the sampled VMs.

7. The method according to claim 1, wherein the load is measured by CPU (Central Processing Unit) utilization of each VM of the sampled VMs.

8. The method according to claim 1, wherein the load is measured by RAM (Random Access Memory) utilization of each VM of the sampled VMs.

9. A cloud computing system comprising at least one hardware processor configured to:

receive a new job;

sample a randomly-selected subset of all VMs (Virtual Machines) presently running at the cloud computing system for a load currently handled by each of the sampled VMs, wherein the load is a measure of computation burden, and wherein the randomly-selected subset does not include all the VMs presently running at the cloud computing system;

if the load currently handled by each of the sampled VMs is within operational bounds, send the new job to one of the VMs which currently handles a highest one of the loads;

if the load currently handled by each of the sampled VMs is beyond operational bounds: (a) send the new job to one of the VMs which currently handles a lowest one of the loads, and (b) if the load currently handled by each of the sampled VMs is beyond operational bounds by more than an activation threshold, instantiating a new VM in the cloud computing system in order to receive future jobs but not the new job, wherein the activation threshold is at least 10% larger than the operational bounds; and deciding, by each of the VMs presently running at the cloud computing system, when to terminate itself.

10. The cloud computing system according to claim 9, wherein the at least one hardware processor is further configured to apply a growth limit policy to new VM instantiation.

11. The cloud computing system according to claim 10, wherein the applying of the growth limit policy to new VM instantiation comprises:

limiting a number of VMs in wakeup mode, so as to prevent an instantiation of an undesirably large number of new VMs when the load currently handled by the VMs rises.

12. The cloud computing system according to claim 9, wherein the deciding is based on running a timer by each of the VMs presently running at the cloud computing system when each of the VMs presently running at the cloud computing system becomes idle.

13. The cloud computing system according to claim 9, wherein the load is measured by a number of jobs active in each VM of the sampled VMs.

14. The cloud computing system according to claim 9, wherein the load is measured by a number of open HTTP (HyperText Transfer Protocol) connections in each VM of the sampled VMs.

15. The cloud computing system according to claim 9, wherein the load is measured by CPU (Central Processing Unit) utilization of each VM of the sampled VMs.

16. The cloud computing system according to claim 9, wherein the load is measured by RAM (Random Access Memory) utilization of each VM of the sampled VMs.

17. A computer program product comprising a non-transitory computer-readable storage medium having program code embodied thereon, the program code executable by at least one hardware processor for:

receiving a new job at a cloud computing system;

sampling a randomly-selected subset of all VMs (Virtual Machines) presently running at the cloud computing system for a load currently handled by each of the VMs, wherein the load is a measure of computation burden, and wherein the randomly-selected subset does not include all the VMs presently running at the cloud computing system;

if the load currently handled by each of the sampled VMs is within operational bounds, sending the new job to one of the sampled VMs which currently handles a highest one of the loads;

if the load currently handled by each of the sampled VMs is beyond operational bounds: (a) sending the new job to one of the sampled VMs which currently handles a lowest one of the loads, and (b) if the load currently handled by each of the sampled VMs is beyond operational bounds by more than an activation threshold, instantiating a new VM in the cloud computing system in order to receive future jobs but not the new job, wherein the activation threshold is at least 10% larger than the operational bounds; and deciding, by each of the VMs presently running at the cloud computing system, when to terminate itself.

18. The computer program product according to claim 17, wherein the program code is further executable by said at least one hardware processor for applying a growth limit policy to new VM instantiation.

19. The computer program product according to claim 18, wherein the applying of the growth limit policy to new VM instantiation comprises:
   limiting a number of VMs in wakeup mode, so as to prevent an instantiation of an undesirably large number of new VMs when the load currently handled by the VMs rises.

20. The computer program product according to claim 17, wherein the deciding is based on running a timer by each of the VMs presently running at the cloud computing system when each of the VMs presently running at the cloud computing system becomes idle.

21. The computer program product according to claim 17, wherein the load is measured by a number of jobs active in each VM of the sampled VMs.

22. The computer program product according to claim 17, wherein the load is measured by a number of open HTTP (HyperText Transfer Protocol) connections in each VM of the sampled VMs.

23. The computer program product according to claim 17, wherein the load is measured by CPU (Central Processing Unit) utilization of each VM of the sampled VMs.

24. The computer program product according to claim 17, wherein the load is measured by RAM (Random Access Memory) utilization of each VM of the sampled VMs.

\* \* \* \* \*